(12) United States Patent
Kinoshita

(10) Patent No.: US 11,797,804 B2
(45) Date of Patent: Oct. 24, 2023

(54) PRINTING SYSTEM, IMAGE PROCESSING APPARATUS, AND COMPARISON METHOD

(71) Applicant: Hidenori Kinoshita, Tokyo (JP)

(72) Inventor: Hidenori Kinoshita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/809,020

(22) Filed: Jun. 27, 2022

(65) Prior Publication Data

US 2023/0049493 A1 Feb. 16, 2023

(30) Foreign Application Priority Data

Jul. 30, 2021 (JP) .................................. 2021-126002
Apr. 1, 2022 (JP) .................................. 2022-061913

(51) Int. Cl.
*G06F 3/12* (2006.01)
*G06K 15/02* (2006.01)
*G06V 30/416* (2022.01)
*G06V 30/414* (2022.01)

(52) U.S. Cl.
CPC ......... *G06K 15/181* (2013.01); *G06V 30/414* (2022.01); *G06V 30/416* (2022.01)

(58) Field of Classification Search
None
See application file for complete search history.

(56) References Cited

U.S. PATENT DOCUMENTS

| 2013/0250370 | A1* | 9/2013 | Kojima | H04N 1/00087 358/405 |
| 2014/0285852 | A1* | 9/2014 | Aikawa | B41F 33/0036 358/3.24 |
| 2015/0078627 | A1* | 3/2015 | Fukase | G06T 7/001 382/112 |
| 2016/0124690 | A1 | 5/2016 | Kimura et al. | |
| 2018/0198937 | A1* | 7/2018 | Yoshizawa | H04N 1/4097 |
| 2020/0234422 | A1* | 7/2020 | Esumi | H04N 1/00005 |
| 2020/0341699 | A1 | 10/2020 | Kinoshita | |
| 2021/0042065 | A1* | 2/2021 | Yamamoto | G06F 3/121 |
| 2021/0141577 | A1* | 5/2021 | Ito | G06F 3/1285 |
| 2021/0264230 | A1* | 8/2021 | Murayama | G06K 15/027 |
| 2021/0294542 | A1* | 9/2021 | Miyake | G06F 3/1256 |

(Continued)

FOREIGN PATENT DOCUMENTS

AU 2008264171 7/2010
EP 2782324 9/2014

(Continued)

OTHER PUBLICATIONS

Extended European Search Report for 22181078.1, dated Dec. 13, 2022.

*Primary Examiner* — Dung D Tran
(74) *Attorney, Agent, or Firm* — IPUSA, PLLC

(57) ABSTRACT

A printing system includes processing circuitry. The processing circuitry acquires print data of a plurality of pages and extracts comparison data from the print data for each page. The processing circuitry, from first image data read from a printed material on which the print data is printed, acquires second image data at a position corresponding to the comparison data, for each page of the printed material. The processing circuitry outputs a comparison result of the comparison data and the read image data for each page.

13 Claims, 16 Drawing Sheets

(56) References Cited

U.S. PATENT DOCUMENTS

2021/0321011 A1\* 10/2021 Ito .................... H04N 1/00633
2022/0121145 A1   4/2022 Kinoshita
2022/0126601 A1\* 4/2022 Mutsuno ............... G06F 3/1282
2022/0276812 A1\* 9/2022 Kashiwagi ............ G06F 3/1208

FOREIGN PATENT DOCUMENTS

| EP | 3779665 | 2/2021 |
| JP | 2011-213006 | 10/2011 |
| JP | 2642738 | 9/2013 |
| JP | 2016-092533 | 5/2016 |

\* cited by examiner

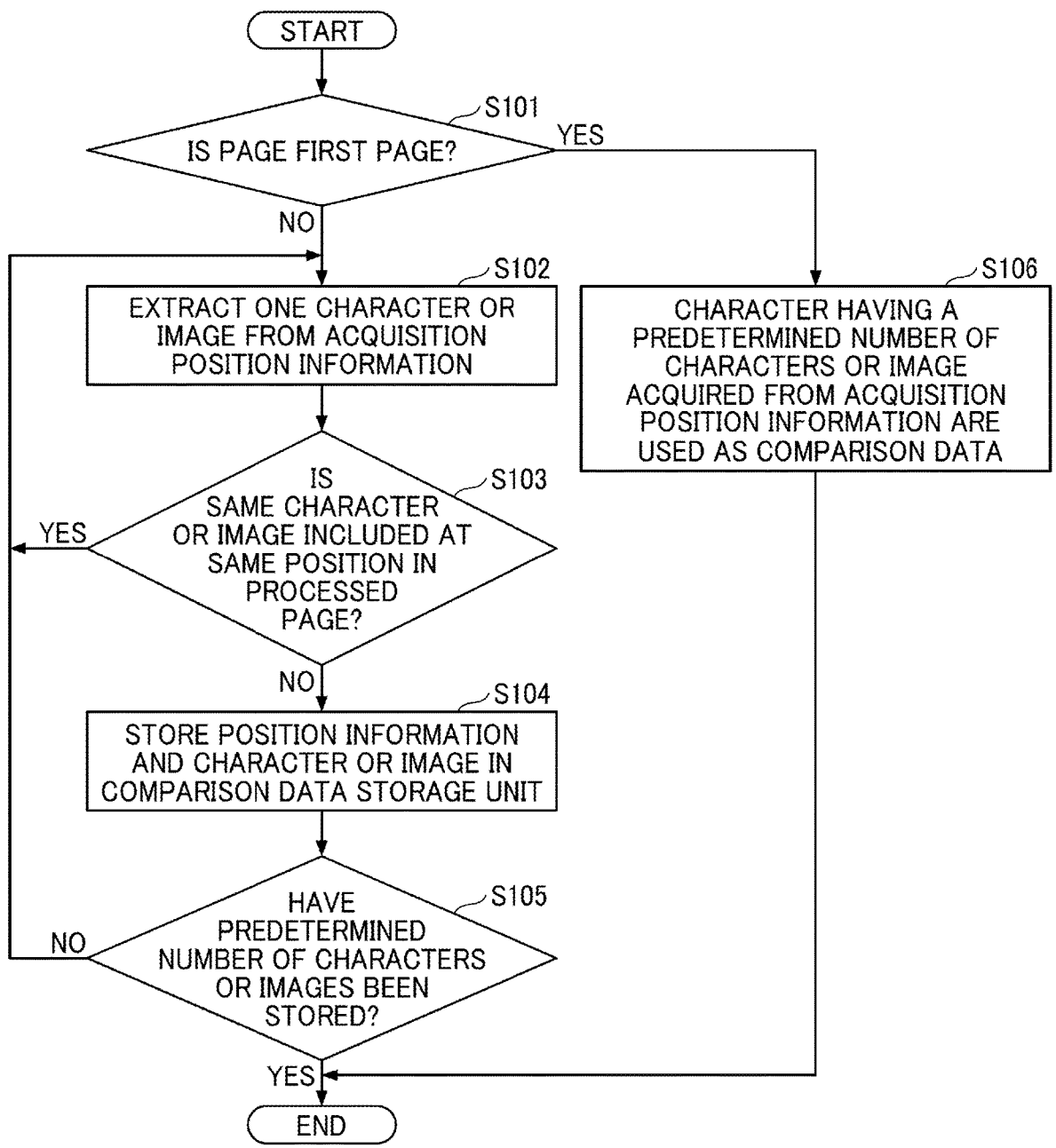

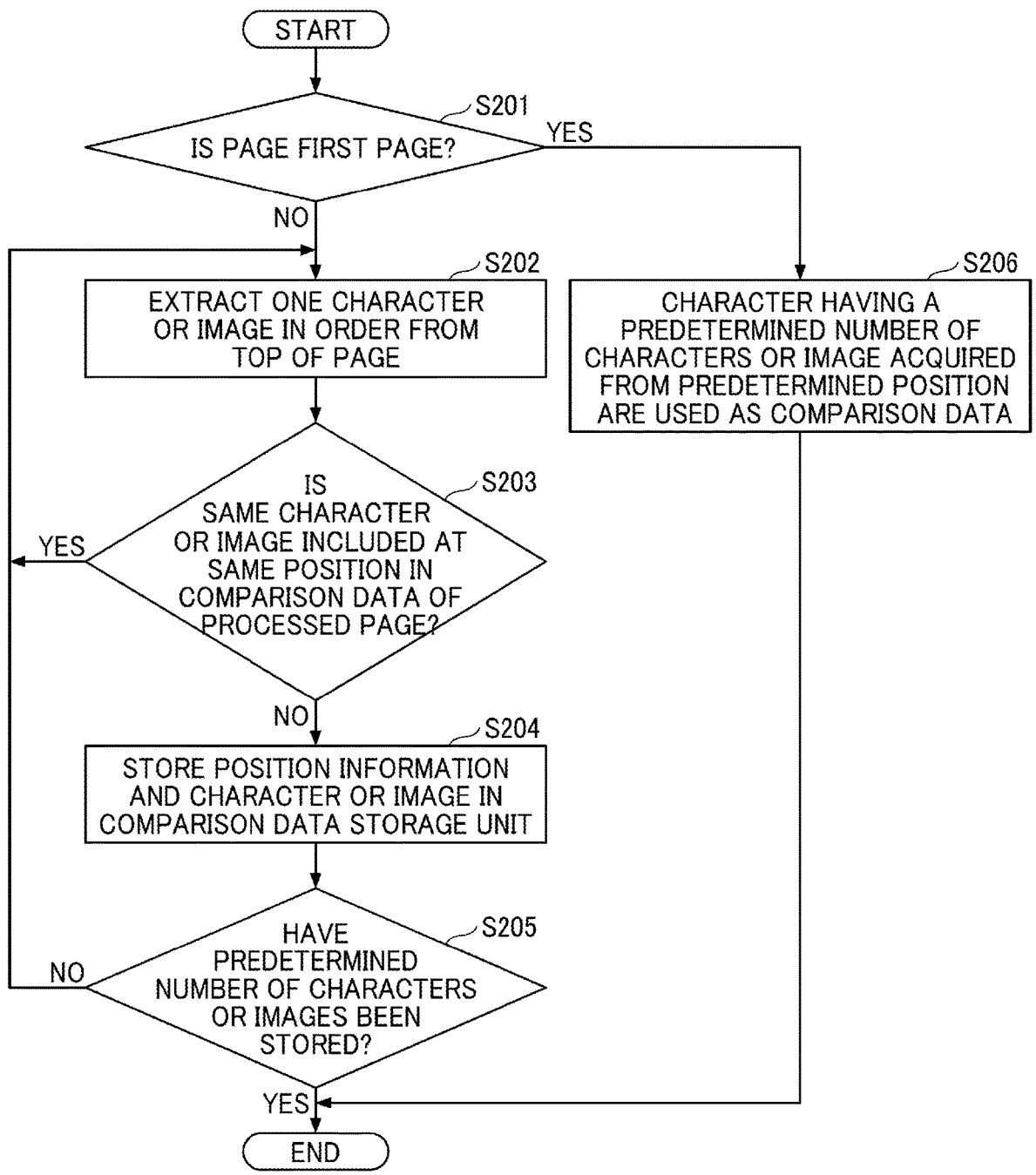

FIG. 17

EXAMPLE OF A DISPLAY SCREEN OF CONTROLLER: 520

| No 521 | NAME OF FORM 522 | IMAGE FORMING APPARATUS 523 | STATE 524 | NUMBER OF PAGES 525 |
|---|---|---|---|---|
| 1 | XXXX | PR1 | PRINT COMPLETION | XXXX |
| 2 | XXXX | PR1 | PRINTING | XXXX |
| 3 | XXXX | PR2 | PAGE DIFFERENCE OCCURRING | XXXX |
| 4 | XXXX | PR1 | PRINT WAITING | XXXX |
| 5 | XXXX | PR2 | PRINT WAITING | XXXX |

530

PAGE DIFFERENCE OCCURRING PAGE NUMBER XX — 531
DIFFERENT CONTENTS   DIFFERENCE IN TEXT — 532
PROCESSING SELECTION  [CANCEL] [CONTINUE]
                         533      534

FIG. 18

BUSINESS PARTNER SURVEY TABLE

| PREFECTURE | | DATE OF SURVEY MONTH DAY YEAR |
|---|---|---|
| | | PERSON IN CHARGE |

| STORE NAME | | CHANGES | | COMPANY FORM | |
|---|---|---|---|---|---|
| | | | | COMPANY LIMITED | COMPANY WITH LIMITED LIABILITY |
| ADDRESS | | | | GENERAL PARTNERSHIP COMPANY | JOINT-STOCK COMPANY |
| CEO | | | | ONE-PERSON BUSINESS | OTHERS |

| BRANCH OR SALES OFFICE | |
|---|---|
| STORE MANAGER OR OFFICE DIRECTOR | ADDRESS |
| | |

| YEAR ESTABLISHED | | DATE OF BUSINESS START | | ACCOUNTING PERIOD | | CAPITAL | |
|---|---|---|---|---|---|---|---|

| | NUMBER OF BOARD MEMBERS | | | NUMBER OF EMPLOYEES | | |
|---|---|---|---|---|---|---|
| BOARD MEMBERS AND EMPLOYEES | JOB TITLE | NAME | AGE | EDUCATIONAL QUALIFICATION | RELATIONSHIP TO OWNER | OTHERS | IMPORTANCE |
| | | | | | | | |
| | | | | | | | |
| | | | | | | | |
| | | | | | | | |
| | | | | | | | |

| | TYPE OF BUSINESS | RATIO | ANNUAL BUSINESS | PRIMARY SUPPLIER | CONDITIONS FOR PAYMENT | PRIMARY SALES PARTNER | TERMS OF REIMBURSEMENT |
|---|---|---|---|---|---|---|---|
| TYPE OF BUSINESS | | | | | | | |
| | | | | | | | |
| | | | | | | | |
| | | | | | | | |
| | TOTAL | | | | | | |

| | SUPPLIER | RATIO | ANNUAL PURCHASES | CONDITIONS FOR PAYMENT | SUPPLIER | RATIO | ANNUAL PURCHASES | CONDITIONS FOR PAYMENT |
|---|---|---|---|---|---|---|---|---|
| PURCHASING STATUS | | | | | | | | |
| | | | | | | | | |
| | | | | | | | | |
| | | | | | | | | |
| | | | | | TOTAL | | | |

# PRINTING SYSTEM, IMAGE PROCESSING APPARATUS, AND COMPARISON METHOD

CROSS-REFERENCE TO RELATED APPLICATIONS

This patent application is based on and claims priority pursuant to 35 U.S.C. § 119(a) to Japanese Patent Application Nos. 2021-126002, filed on Jul. 30, 2021, and 2022-061913, filed on Apr. 1, 2022, in the Japan Patent Office, the entire disclosure of which is hereby incorporated by reference herein.

BACKGROUND

Technical Field

Embodiments of the present disclosure relate to a printing system, an image processing apparatus, and a comparison method.

Related Art

In financial contract operations such as insurance or banking, for example, various types of data for contracts are generated and stored in a server or a storage medium in a mixed manner. These data are scanned data of a business form or text data of a trial balance. As to contracts, the data are printed and stored as a set of documents in a storage, for example, a file cabinet or a safe.

In the case of printing an important document, it is demanded to confirm whether each page of the document has been printed. Such confirmation is demanded since a missing page may occur due to jam, multiple feeding, absence of sheet, interrupt printing, and print cancellation.

In order to address such inconveniences, a system that confirms printing of requested document has been disclosed. A typical form printing system performs printing pages each having a two-dimensional code added to each page to specify each page, reads the printed pages, and then analyzes the two-dimensional code to determine whether any page is missing. When a page is missing, the page is automatically reprinted by the form printing system.

SUMMARY

Embodiments of the present disclosure described herein provide a novel printing system including processing circuitry. The processing circuitry acquires print data of a plurality of pages and extracts comparison data from the print data for each page. The processing circuitry, from first image data read from a printed material on which the print data is printed, acquires second image data at a position corresponding to the comparison data, for each page of the printed material. The processing circuitry outputs a comparison result of the comparison data and the read image data for each page.

Embodiments of the present disclosure described herein provide a novel image processing apparatus including processing circuitry. The processing circuitry acquires print data of a plurality of pages and extracts comparison data from the print data for each page. The processing circuitry, from first image data of a printed material on which the print data is printed, acquires second image data corresponding to the comparison data. The processing circuitry outputs a comparison result of the comparison data and the second image data for each page.

Embodiments of the present disclosure described herein provide a novel comparison method. The comparison method includes acquiring, extracting, and outputting. The acquiring acquires print data of a plurality of pages. The extracting extracts comparison data from the print data for each page. The acquiring acquires from first image data read from a printed material on which the print data is printed, second image data at a position corresponding to the comparison data, for each page of the printed material. The outputting outputs a comparison result of the comparison data and the second image data for each page.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 10 is a flowchart of an example of a method of extracting a character or an image different from a processed page, as comparison data;

FIG. 12 is a flowchart of an example of a method for extracting a character or an image different from the comparison data of the processed page as comparison data;

FIG. 17 is a diagram illustrating an example of a print job management screen displayed by a console of a management server or a client PC; and FIG. 18 is a diagram illustrating an example of a form.

Figure 1:
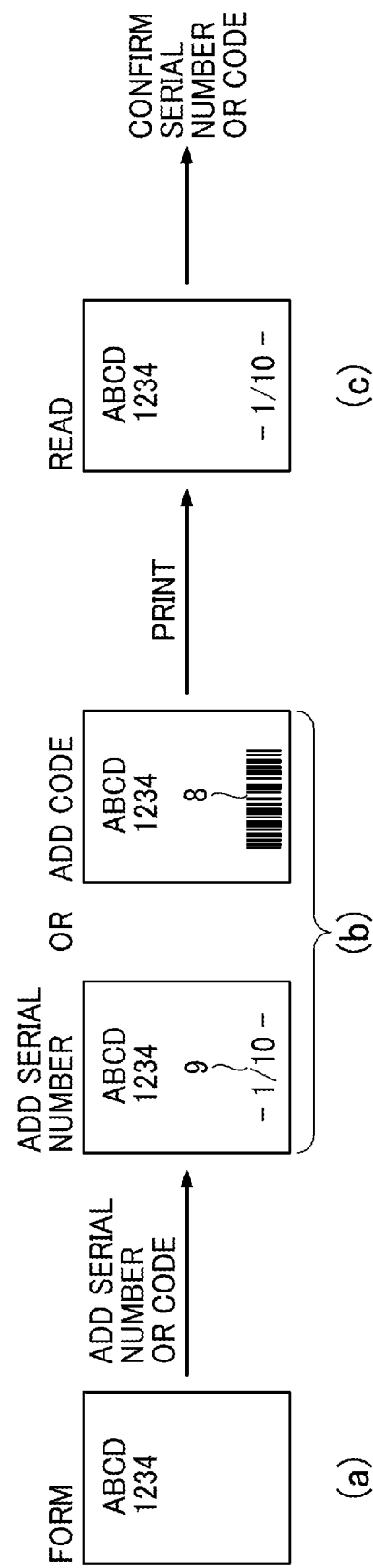
FIG. 1 is a diagram illustrating a comparison method as a control sample.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Descriptions are given of a printing system and a comparison method executed by the printing system according to an embodiment of the present disclosure, with reference to the drawings.

Description of Comparative Technology

First, a technique compared with the present embodiment is described below with reference to FIG. 1. For example, there are the following two methods for confirming that each page of a document has been printed. FIG. 1 is a diagram illustrating a comparison method as a control sample.

First Method

First, a printing system adds a serial number 9 (page number) or a two-dimensional code 8 (or bar code) to the original print data (FIG. 1(*a*)) and performs printing (FIG. 1(*b*)). The printing system reads the serial number and the two-dimensional code of a printed material to determine whether each page has been printed (FIG. 1(*c*)).

Second Method

The printing system then converts the original print data into an image and prints the image. Then, the printing system compares the overall image data generated by reading the printed material with the image of the original print data.

However, in First Method, the printing system is demanded to change the printing format of the form in advance to add the serial number or the two-dimensional code, and further to print the serial number or the two-dimensional code on the printed material. In Second Method, imaging processing is easy when the print data is image data such as portable document format (PDF) or tagged image file format (TIFF). However, when the print data is in a page description language (PDL) format such as PostScript® (PS) or Epson standard code for printers (ESC/P®), the image data is to be generated from the print data. Further, since the data amount increases for the overall comparison, a high-speed information processing apparatus is to be prepared.

Outline of Comparison Method of Present Embodiment

In order to address the above-described inconveniences, the present embodiment employs the following comparison method.

The printing system records a part (character or image) that is different from a processed page in each print page of a print target material as comparison data together with position information. Then, the printing system compares image data obtained by reading the printed material with the comparison data to determine whether each page is printed. Further, when the image data includes characters, optical character recognition (OCR) may be employed to read the printed material. A processed page refers to a page for which comparison processing or comparison data generation has been completed for print data or image data obtained by performing image formation processing on the print data.

Figure 2:
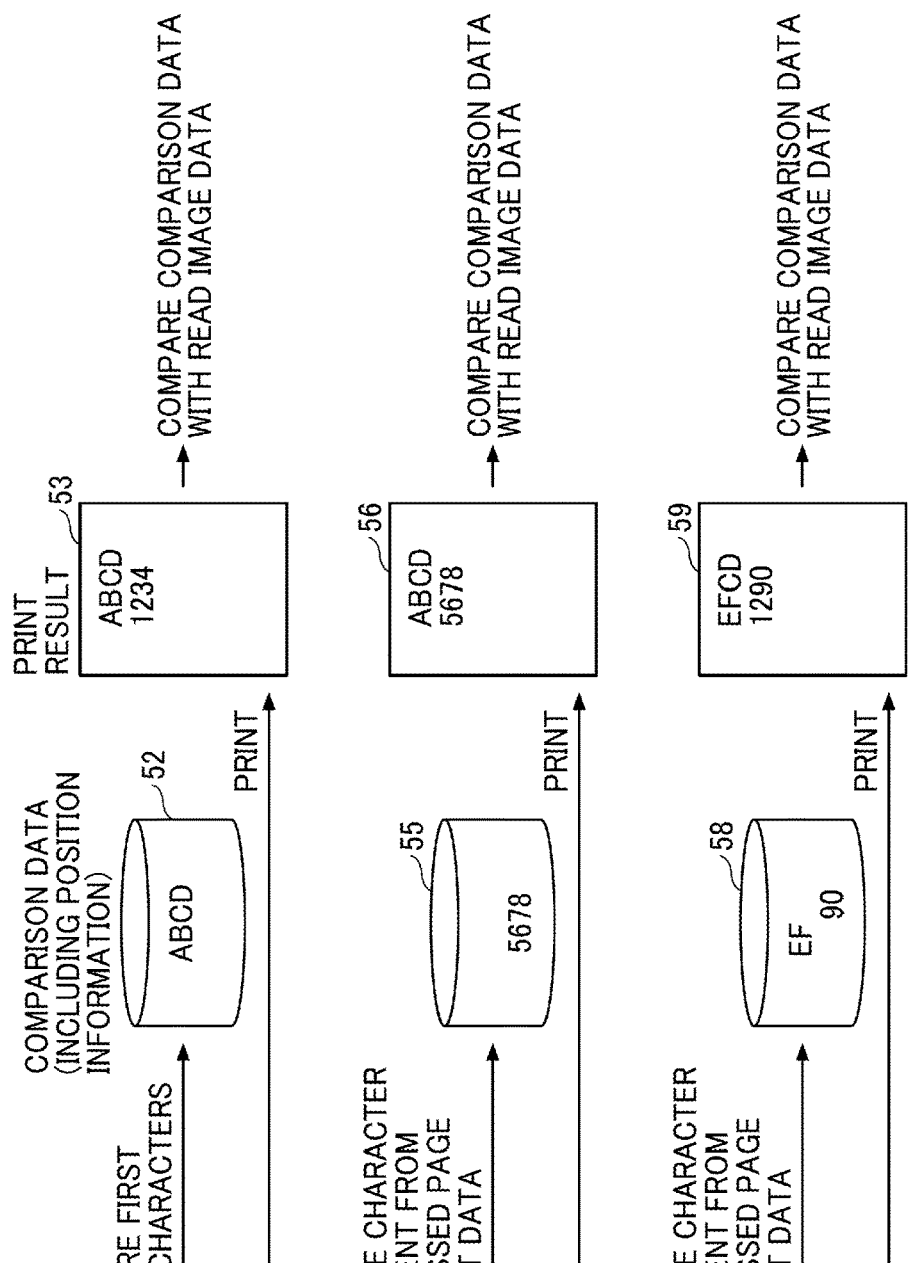
FIGS. 2A, 2B and 2C are diagrams, each illustrating a comparison method according to embodiments of the present disclosure.

FIGS. 2A, 2B and 2C are diagrams, each illustrating the comparison method according to embodiments of the present disclosure. Specifically, FIG. 2A is a diagram illustrating print data 51 of the first page, comparison data 52, and image data 53 of the printed material. FIG. 2B is a diagram illustrating print data 54 of the second page, comparison data 55, and image data 56 of the printed material. FIG. 2C is a diagram illustrating print data 57 of the third page, comparison data 58, and image data 59 of the printed material.

First, the printing system generates the comparison data 52 of the first page. The comparison data 52 of the first page includes a character or an image (including a figure), and the position information. The character or the image is acquired from the print data 51 of the first page in accordance with acquisition position information set and stored in advance. The position information specifies the position of the character or the image. The acquisition position information is related to a position at which a character or an image is acquired in a page of the received print data. The acquisition position information may include not only position information to acquire comparison data in the page (start point coordinates and end point coordinates in the case of a rectangle) but also the number of characters to be acquired or the range size of an image to be acquired in the page. The acquisition position information may be set in advance. Therefore, the acquisition position information may be referred to as setting information or reference information. The position and the number of characters, or the range, each serving as a reference for acquiring a character or an image in a page are set in such setting information or reference information. The acquisition position information may be set by inputting the position, the number of characters, and the range displayed on a setting screen of an operation panel of an apparatus, or a web browser of a personal computer (PC) connected to the apparatus or a network. In a case where the print data from which the comparison data is to be acquired is in a language such as PDL, the setting screen may display the position of characters, the number of characters, and the characters included in the PDL data, with reference to the included data in the print data, so that a user may select the characters. In a case where the print data is image data such as PDF or joint photographic experts group (JPEG), an input screen that allows the user to input a position or range by dragging and dropping may be displayed. The setting screen may be automatically switched according to the file format of the print data. The acquisition position information may be randomly determined by a random number.

In FIG. 2A, the characters "ABCD", which is the first four characters of "ABCD 1234" in the print data 51, is the comparison data 52.

The comparison data of the second and subsequent pages includes a character or an image different from the processed page in the print data. The acquisition position information may be set for each page or may be different for each page, so that a character or an image different from the processed page is specified, based on the acquired position information. The number of characters or range size of the image may be set in advance or may be randomly set by a random number. The comparison data of the second and subsequent pages is also stored together with the position information. Note that the comparison data of the second and subsequent pages may include characters or images different from the acquired comparison data. That is, in the print data, the comparison data of the subsequent page is a character or an image different from the comparison data that has already been acquired up to the previous page. Since the comparison data is the comparison target alone, the load of comparison may be reduced.

In FIG. 2B, the characters "ABCD" of "ABCD 5678" in the print data 54 match "ABCD" in the print data 51 of the previous page illustrated in FIG. 2A. Since the characters "5678" in the print data 54 do not match the print data 51 of the previous page, the characters "5678" are included in the comparison data 55.

The similar method to the above-described method is applied to the third page. In FIG. 2C, the characters "EF" of "EFCD" in the print data 57 of FIG. 2C do not match the print data 51 of the first page of FIG. 2A and the print data 54 of the second page of FIG. 2B. In FIG. 2C, the numbers "90" of "1290" do not match the print data 51 of the first page of FIG. 2A and the print data 54 of second the page of FIG. 2C. Therefore, the characters "EF" and the numbers "90" are included in the comparison data 58.

According to the comparison method described above, since different comparison data is extracted for each page. Due to this method, when the image data of the printed material and the print data are compared with each other, it is determined that each page of the print data is printed by comparing with a relatively small amount of data. Since the print data is not compared with the overall page of the printed material, misjudgment in comparison is not likely to occur depending on the presence or absence of dust on the page or faint in the character or image of the page. A difference in a page state such as page omission or insertion of incorrect page in the printing of a form may be accurately detected when printing a form in which the quality does not matter whether a printed material is printed according to print data.

Terms

The print data is data for printing described in a language that is interpreted by an image forming apparatus such as PDL. However, the print data may be a file such as PDF created by an application program.

The comparison data includes a character or an image that is included in a part of each page and is not included in the rest of the pages. The comparison data may not he completely included in the rest of the pages. However, since the frequency of overlapping is relatively low, the comparison data may be data that ensure no missing pages.

A comparison result may include both match and mismatch in association with a page or may include a mismatched page alone or a matched page alone to be stored as a result.

Configuration Example of Printing System

Figure 3:
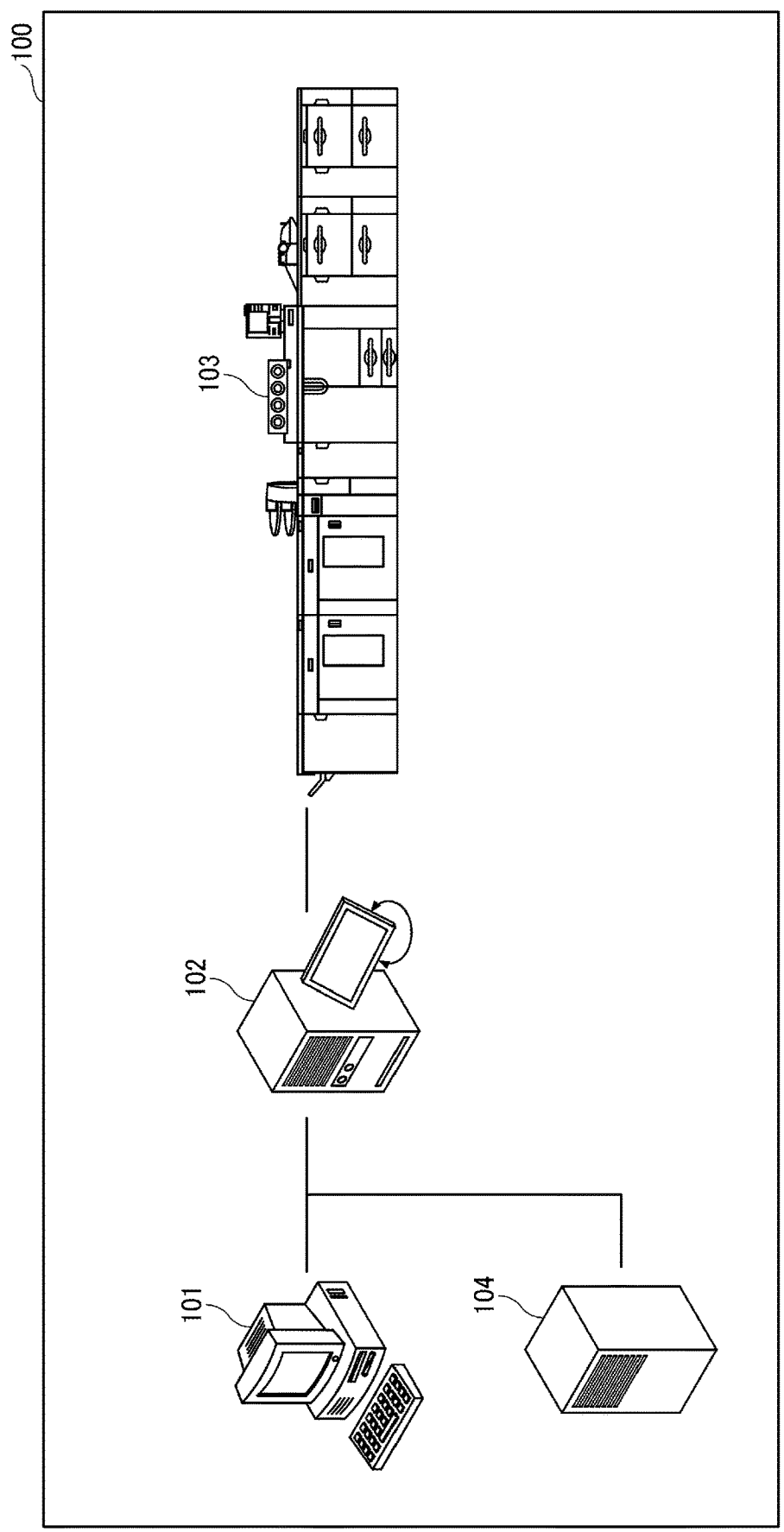
FIG. 3 is a diagram illustrating a configuration of a printing system according to embodiments of the present disclosure.

Descriptions are given of an example of a system configuration of a printing system 100 with reference to FIG. 3. FIG. 3 is a diagram illustrating the configuration of the printing system 100 according to embodiments of the present disclosure. As illustrated in FIG. 3, the printing system 100 includes a client PC 101, a digital front end (DFE) 102, an image forming apparatus 103, and a management server 104. These components are communicably connected to each other via the Internet.

The client PC 101 creates a print job in response to an instruction by a user, and then transmits the print job to the DFE 102 or the management server 104. The client PC 101 includes a display unit such as a liquid crystal display, and input devices such as a mouse and a keyboard.

The DFE 102 receives a print job from the client PC 101, or the management server 104, creates image data by a raster image processor (RIP) engine based on the received print job, and transmits the created image data to the image forming apparatus 103. The image data is also referred to as a drawing data. The DFE 102 is an example of an image processing apparatus.

The image forming apparatus 103 forms an image on a recording medium based on the image data received from the DFE 102.

The management server 104 manages the print jobs received from the client PC 101. In response to a request from the DFE 102, the management server 104 transmits the print job to the DFE 102.

Note that the printing system 100 may communicably connect a plurality of image forming apparatuses 103 and a plurality of client PCs 101.

Hardware Configuration of the DFE 102

Figure 4:
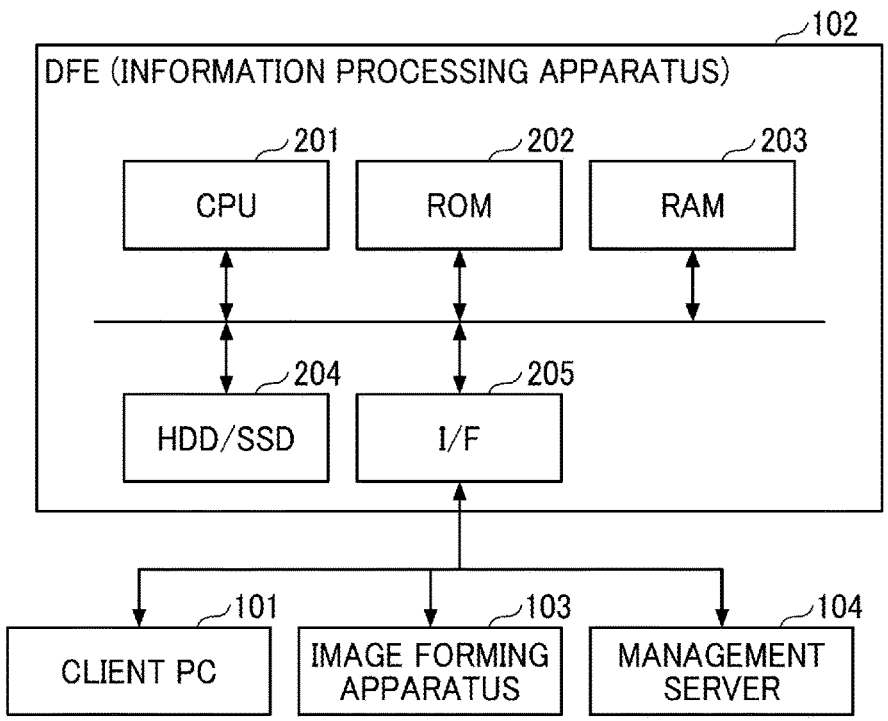
FIG. 4 is a block diagram illustrating a hardware configuration of a digital front end (DFE) of the printing system of FIG. 3.

Next, descriptions are given of a hardware configuration of the DFE 102 with reference to FIG. 4. FIG. 4 is a block diagram illustrating the hardware configuration of the DFE 102 of the printing system 100. The DFE 102 includes a central processing unit (CPU) 201, a read only memory (ROM) 202, a random access memory (RAM) 203, a storage device 204, and an interface (I/F) 205. The storage device 204 may include a hard disk drive (HDD) or a solid state drive (SSD).

The CPU 201 executes a program stored in the ROM 202 using the RAM 203 as a work area. By so doing, the overall operations of the DFE 102 are controlled to provide various functions.

The storage device 204 such as the HDD or the SSD is used as a memory and stores setting values set in advance. The information stored in the storage device 204 may be used when the CPU 201 reads and executes the program.

The I/F 205 is an interface that allows the DFE 102, the client PC 101, the image forming apparatus 103 and the management server 104 communicably connect to each other.

Example of Hardware Configuration of the Image Forming Apparatus 103

Figure 5:
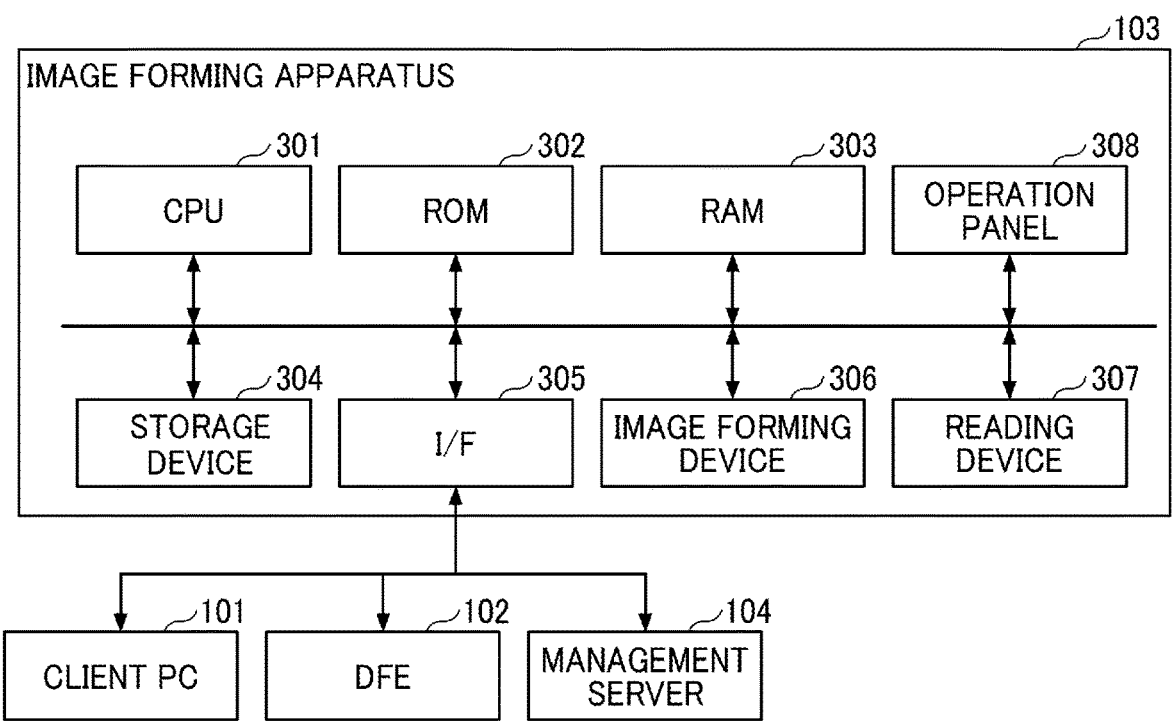
FIG. 5 is a block diagram illustrating a hardware configuration of an image forming apparatus of the printing system of FIG. 3.

Next, descriptions are given of the hardware configuration of the image forming apparatus 103, with reference to FIG. 5. FIG. 5 is a block diagram illustrating a hardware configuration of the image forming apparatus 103 of the printing system 100. The image forming apparatus 103 includes a CPU 301, a ROM 302, a RAM 303, a storage device 304, an I/F 305, an image forming device 306, a reading device 307, and an operation panel 308. The storage device 304 may include the HDD or the SSD.

The CPU 301 executes a program stored in the ROM 302 using the RAM 303 as a work area. By so doing, the overall operations of the image forming apparatus 103 are controlled to provide various functions.

The storage device 304 is used as a memory and stores setting values set in advance. The information stored in the storage device 304 may be read and used by the CPU 301 when the CPU 301 executes a program.

The I/F 305 is an interface that allows the image forming apparatus 103, the DFE 102, the client PC 101 and the management server 104 communicably connect to each other.

The image forming device 306 is a print engine that forms an image on a printing sheet. The reading device 307 reads the image formed on the printing sheet. The operation panel 308 includes a display that displays an operation menu and a state of the image forming apparatus 103 and a touch panel for receiving an operation.

Configuration of the Image Forming Apparatus 103

Figure 6:
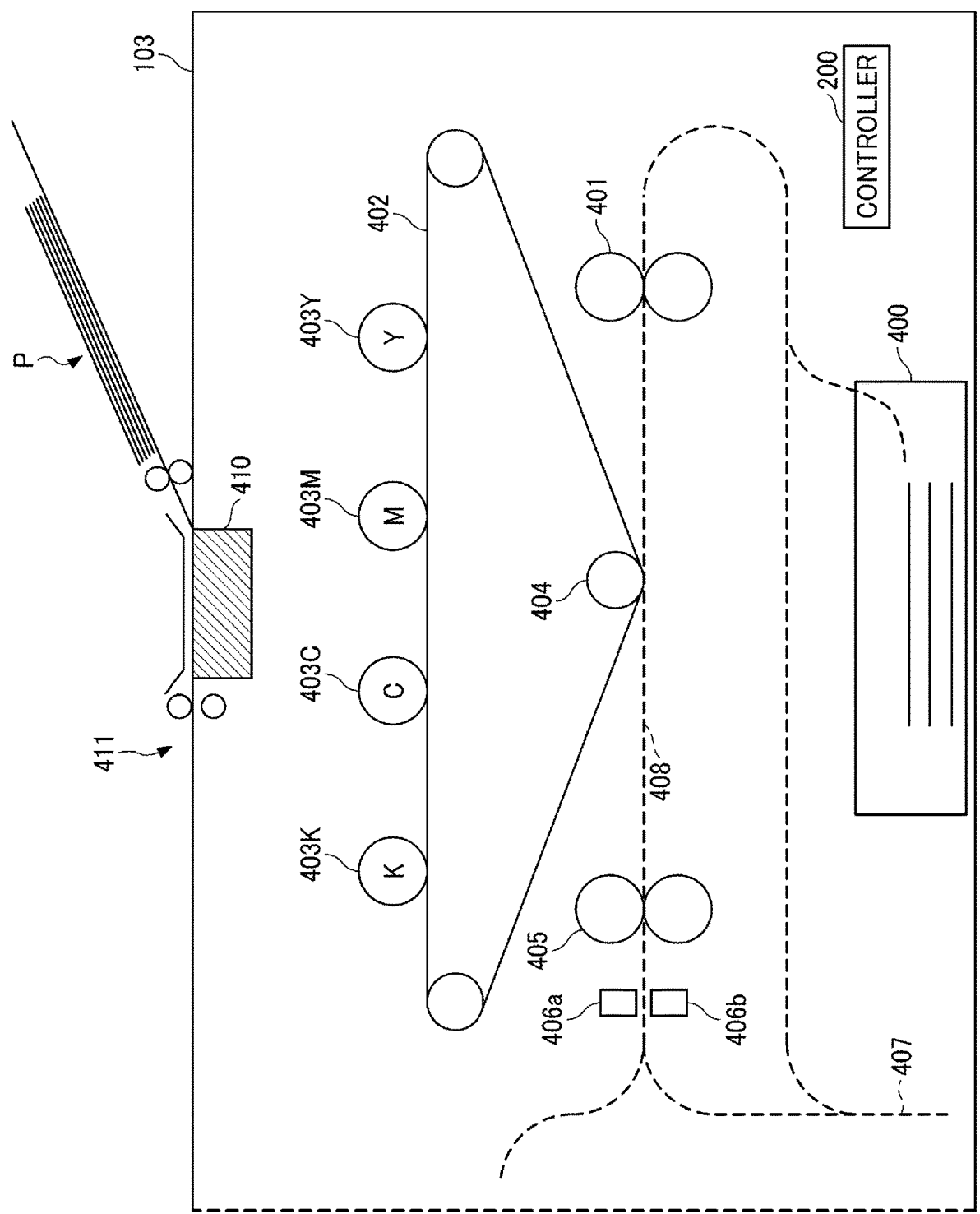
FIG. 6 is a diagram illustrating a configuration of the image forming apparatus of the printing system of FIG. 3.

Next, descriptions are given of the configuration of the image forming apparatus 103, with reference to FIG. 6. FIG. 6 is a diagram illustrating the configuration of the image forming apparatus 103 of the printing system 100 of FIG. 3. As illustrated in FIG. 6, the image forming apparatus 103 includes a tandem-type, electrophotographic photoconductor drums 403Y, 403M, 403C, and 403K, an intermediate transfer belt 402, a secondary transfer roller 404, a sheet feeding device 400, a conveyance roller pair 401, a fixing roller pair 405, inline sensors 406a and 406b, a reversal passage 407, and a conveyance passage 408. The image forming apparatus 103 further includes a controller 200.

The image forming device 306 illustrated in FIG. 5 includes the photoconductor drums 403Y, 403M, 403C, and 403K, the intermediate transfer belt 402, the secondary transfer roller 404, and the fixing roller pair 405. The reading device 307 illustrated in FIG. 5 includes the inline sensors 406a and 406b.

The image forming apparatus 103 is a tandem-type image forming apparatus that has a configuration in which the photoconductor drums 403Y, 403M, 403C, and 403K of colors of black, magenta, cyan, and yellow are aligned in a row along the intermediate transfer belt 402 that functions as a moving device having an endless loop. Hereinafter, the photoconductor drums 403Y, 403M, 403C, and 403K may be referred to as the "photoconductor drums 403" in a singular form. In the image forming apparatus 103, a print sheet is fed from the sheet feeding device 400 and conveyed by the conveyance roller pair 401. An intermediate transfer image that is to be transferred onto the recording medium is formed on the intermediate transfer belt 402. The photoconductor drums 403Y, 403M, 403C, and 403K are aligned along the intermediate transfer belt 402, sequentially from upstream in a conveyance direction of the recording medium.

In the image forming apparatus 103, a latent image is formed on a circumferential surface of each of the photoconductor drums 403 for different colors and is developed with toner into a visible toner image. The toner images in different colors are transferred from the respective photoconductor drums 403 onto the circumferential surface of the intermediate transfer belt 402 such that the toner images are superimposed one atop another on the intermediate transfer belt 402. Thus, a composite full-color toner image (i.e., intermediate transfer image) is formed on the intermediate transfer belt 402.

Then, in the image forming apparatus 103, at a position closest to the conveyance passage 408 of the print sheet indicated by a broken line in FIG. 6, the secondary transfer roller 404 transfers the full-color image from the intermediate transfer belt 402 onto the print sheet conveyed along the conveyance passage 408.

The image forming apparatus 103 further conveys the print sheet bearing the full-color image on the surface to the fixing roller pair 405 by which the full-color image is fixed to the print sheet (for image formation). The fixing roller pair 405 applies heat and pressure to the print sheet bearing the full-color toner image to fix the full-color toner image onto the print sheet. The fixing roller pair 405 generates heat by a built-in heater such as a halogen heater to heat the print sheet.

When duplex printing is performed, the image forming apparatus 103 forms an image on the front side (first face) of the print sheet, then conveys the print sheet to the reversal passage 407 in the conveyance passage 408, reverses the front and back sides (first and second faces) of the print sheet, and then conveys the print sheet again to the position of the secondary transfer roller 404.

The sheet feeding device 400 accommodates a plurality of sheets (print sheet) piled one on another. The sheet feeding device 400 picks up the print sheet loaded and stored in the order from the top by a pickup roller and conveys the print sheet to the conveyance roller pair 401 by using sheet feed rollers as a pair of rollers.

Further, the image forming apparatus 103 includes the inline sensors 406a and 406b disposed downstream from the fixing roller pair 405 in the conveyance direction of the print sheet. The inline sensors 406a and 406b read both sides of the print sheet conveyed by the fixing roller pair 405 and obtains read image data of the image fixed on the print sheet. Note that the inline sensors may not be two inline sensors (inline sensors 406a and 406b) and may be a single inline sensor, e.g., the inline sensor 406a. When the image forming apparatus 103 includes the inline sensor 406a alone, the inline sensor 406a first reads the recording medium at the time at which an image is formed on the front side (first face) of the print sheet. Thereafter, an image is formed on the back side (second face) of the print sheet.

A scanner 410 is disposed on an upper portion of the image forming apparatus 103. The image forming apparatus 103 includes an automatic document feeder (ADF) 411 that serves as a sheet feeder and a cover of the scanner 410. The ADF 411 includes a tray on which a plurality of printed material P is loaded. The ADF 411 is a device that sends one page at a time to the scanner 410 so that each page is scanned in order. The image forming apparatus 103 scans a printed material by the scanner 410 or the inline sensors 406a and 406b.

Note that the image forming apparatus including the scanner 410 may be different from the image forming apparatus 103 that prints printed material.

Functions

Figure 7:
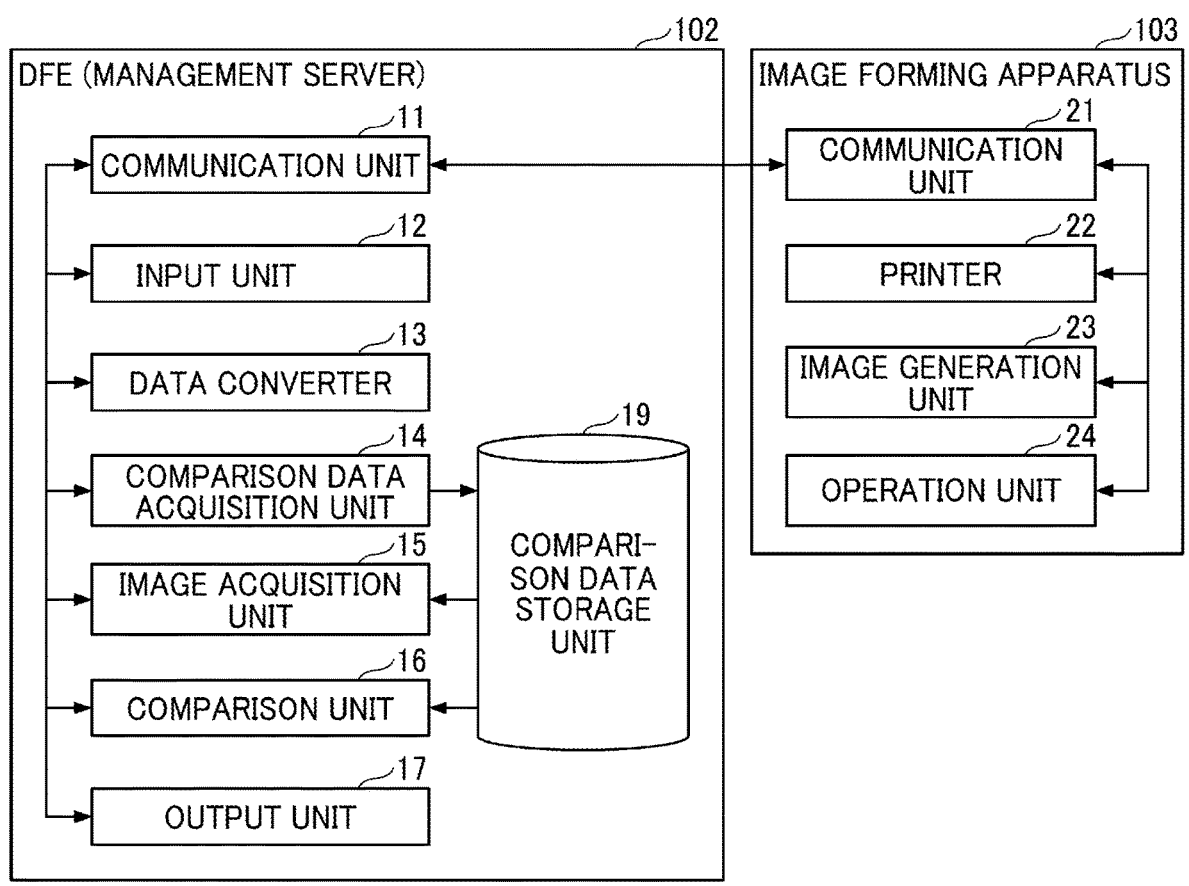
FIG. 7 is a functional block diagram illustrating functions of the printing system of FIG. 3 in blocks.

FIG. 7 is a functional block diagram illustrating functions of the printing system 100 in blocks. In FIG. 7, the DFE 102 and the image forming apparatus 103 have the functions described below. Instead of the DFE 102, however, the management server 104 may have the function of the DFE 102. Alternatively, the image forming apparatus 103 may have the functions of the DFE 102 in FIG. 7. In FIG. 7, the functions of the overall printing system are shared by the DFE 102 and the image forming apparatus 103 for the sake of convenience. Some functions in FIG. 7 that are operable without using specific hardware, such as a printer 22 and an image generation unit 23, may be included in any apparatus of the printing system 100.

DFE

The DFE 102 includes a communication unit 11, an input unit 12, a data converter 13, a comparison data acquisition unit 14, an image acquisition unit 15, a comparison unit 16, an output unit 17, and a comparison data storage unit 19. The functions of the DFE 102 are functions or methods achieved by the CPU 201 executing instructions included in one or more programs loaded from the storage device 204 to the RAM 203 illustrated in FIG. 4.

The communication unit 11 receives print data from the client PC 101 and transmits image data including ripped print data to the image forming apparatus 103. Further, the communication unit 11 receives image data generated by reading a printed material from the image forming apparatus 103. Note that the descriptions of known functions of the DFE 102 are omitted in the present embodiment.

The print data may be transmitted in a file format such as PDF or TIFF or may be transmitted after being converted into PDL data by the client PC 101.

The input unit 12 receives print data as input data via the communication unit 11. In a case where print data is in a file format such as PDF or TIFF, the data converter 13 converts the print data into PDL data in the same manner as a printer driver. In other words, in the PDL, the position, size, color, and font of each character are designated, and the position of the image is designated.

Thus, the comparison data acquisition unit 14 acquires the comparison data from the print data. The comparison data acquisition unit 14 acquires characters or images that are not included in the processed pages, together with the position information. In a case where N pages are processed starting from page 1, the range of the processed pages is page 1 to page N-1. Alternatively, the comparison data acquisition unit 14 acquires characters or images that are not included in the comparison data of the processed page, together with the position information. The detailed description of this operation is described below.

In a case where the comparison data is a character, two formats are the comparison data, which are character data (character code) and image data.

In a case where the comparison data is a character, an OCR process is executed on the image data of the printed material transmitted from the image forming apparatus 103. In a case where the comparison data is image data, the comparison data acquisition unit 14 converts the character data into image data.

The image acquisition unit 15 extracts read image data from the image data of the printed material transmitted from the image forming apparatus 103 based on the position information of the comparison data. The read image data may be referred to as original image data. The comparison unit 16 compares the read image data with the comparison data and transmits a comparison result to the management server 104. When a page in which the read image data and the comparison data do not match, the comparison unit 16 determines that the page is a missing page. The management server 104 manages the execution state of a print job together with a management number and a file name of a print target and records the missing page in association with the print job.

The output unit 17 outputs the comparison result to a console of the DFE 102 or the client PC 101. The output unit 17 may function as a web server. Further, the output unit 17 transmits the comparison result to the image forming apparatus 103 so that the image forming apparatus 103 displays the comparison result.

TABLE 1

| Page Number | Comparison Data | Position Information |
|---|---|---|
| 1 | ABC | $(x_{s1}, y_{s1}) (x_{e1}, y_{e1})$ |
|   | X | $(x_{s2}, y_{s2}) (x_{e2}, y_{e2})$ |

TABLE 1-continued

| Page Number | Comparison Data | Position Information |
|---|---|---|
| 2 | D | $(x_{s3}, y_{s3}) (x_{e3}, y_{e3})$ |
|   | PQR | $(x_{s4}, y_{s4}) (x_{e4}, y_{e4})$ |
| 3 | E | $(x_{s5}, y_{s5}) (x_{e5}, y_{e5})$ |
|   | STU | $(x_{s6}, y_{s6}) (x_{e6}, y_{e6})$ |
| ... | ... | ... |

Table 1 indicates an example of the comparison data. In the comparison data storage unit 19, character data or image data as comparison data is stored for each page in association with the position information. In a case where the comparison data is a character, the comparison data may be stored as a character code or as image data. The details of the method of generating the comparison data are described below, with reference to FIG. 11. Further, although a single set of position information is associated with multiple consecutive characters in Table 1, the position information may be associated with each character.

TABLE 2

| Page Number | PDL Data | PDL Character Information | PDL Position Information |
|---|---|---|---|
| 1 | 609 833 M <002400250026>[62 61 0]xS | ABC | (609, 833) |
|   | 741 983 M <003B003C003D>[59 58 0]xS | XYZ | (741, 983) |
| 2 | 609 833 M <00240025>[62 0]xS | AB | (609, 833) |
|   | 732 833 M <0027>S | D | (732, 833) |
|   | 741 983 M <003300340035>[57 75 0]xS | PQR | (741, 983) |
| 3 | 609 833 M <0024>S | A | (609, 833) |
|   | 671 833 M <0028>S | E | (671, 833) |
|   | 727 833 M <0027>S | D | (727, 833) |
|   | 741 983 M <003600370038> [49 63 0]xS | STU | (741, 983) |
| ... | ... | ... | ... |

Table 2 indicates print data when the print data described in PDL is PostScript®. In a case where the print data is described in PostScript®, the print data is created as a set of coordinates and characters. The item of PDL data in Table 2 includes character information and position information for a character string of one or more characters. The item of PDL character information in Table 2 is the character information related to a character string of one or more characters acquired from the PDL data. The item of PDL position information in Table 2 is the position information of a character string acquired from the PDL data. For example, the PDL position information is information indicating a position (for example, coordinates) for printing the PDL character information corresponding to the PDL position information. The PDL character information and the PDL position information indicated in Table 2 are generated before the comparison data is generated.

Image Forming Apparatus

The image forming apparatus 103 includes a communication unit 21, the printer 22, the image generation unit 23, and an operation unit 24 provided with a display. These functions of the image forming apparatus 103 are achieved by the CPU 301 illustrated in FIG. 5 executing instructions included in one or more programs loaded from the storage device 304 to the RAM 303, or by controlling the hardware illustrated in FIG. 6 by one or more programs.

The communication unit 21 receives the image data including ripped print data from a DFE 102. In addition, the image generation unit 23 transmits the generated image to the DFE 102. When the image forming apparatus 103 includes the comparison data storage unit 19 or the comparison data is shared, the communication unit 21 transmits the scanned image alone acquired from the image data of the printed material to the DFE 102 based on the position information of the comparison data.

The image generation unit 23 scans a printed material and generates image data of the printed material. The operation unit 24 is implemented by an operation panel 308 including a touch screen and keyboard and displays information and receives user operations.

Overall Flow of Process

Figure 8:
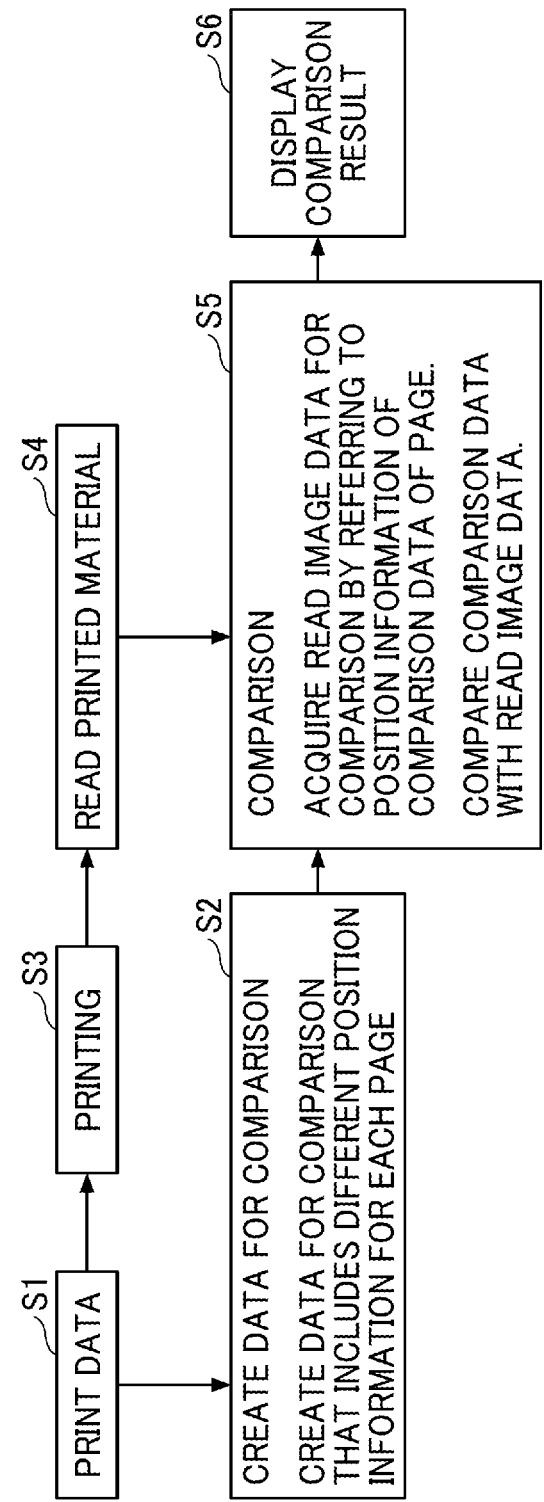
FIG. 8 is a flowchart of an overall flow of a process of determining whether any page of a printed form is missing by using comparison data, according to embodiments of the present disclosure.

FIG. 8 is a diagram illustrating an overall flow of a process for determining, by using comparison data, whether a page of a printed form is missing, according to embodiments of the present disclosure.

A user operates the client PC 101 to select a document file (electronic data) to be printed, such as a contract document, and performs printing (step S1). The client PC 101 transmits the document file selected by the user or print data converted from the document file into PDL data, to the DFE 102.

The comparison data acquisition unit 14 of the DFE 102 creates comparison data for each page and stores the comparison data in the comparison data storage unit 19 (step S2).

When the storage of the comparison data is finished or while the comparison data is being generated, the image data ripped by the DFE 102 is transmitted to the image forming apparatus 103 (step S3). The image forming apparatus 103 prints the image data. The image data ripped by the DFE 102 may be transmitted to the image forming apparatus 103 even if the storage of the comparison information for each page is not finished. In other words, when the storage of the comparison data is advanced by one or more pages from the printing, the read image data and the comparison data are compared in real time.

The image generation unit 23 of the image forming apparatus 103 reads (scans) the printed material in parallel with the printing to generate an image data (step S4). Alternatively, the image generation unit 23 of the image forming apparatus 103 generates the image data of the printed material when the printing of each page (or more than a certain number of pages) is finished, and the user operates the scanner 410 to read the printed material.

The DFE 102 acquires image data of the printed material, and the image acquisition unit 15 of the DFE 102 acquires read image data from the image data by referring to the position information of the comparison data of the page to be compared (step S5). The comparison unit 16 of the DFE 102 compares the comparison data with the read image data.

The comparison unit 16 of the DFE 102 stores the comparison result for each page, and transmits the comparison result to the management server 104 (step S6). The user may display and view the comparison result on, for example, the client PC 101, the console of the DFE 102, or the operation panel 308.

Procedure of Process or Operation

Figure 9:
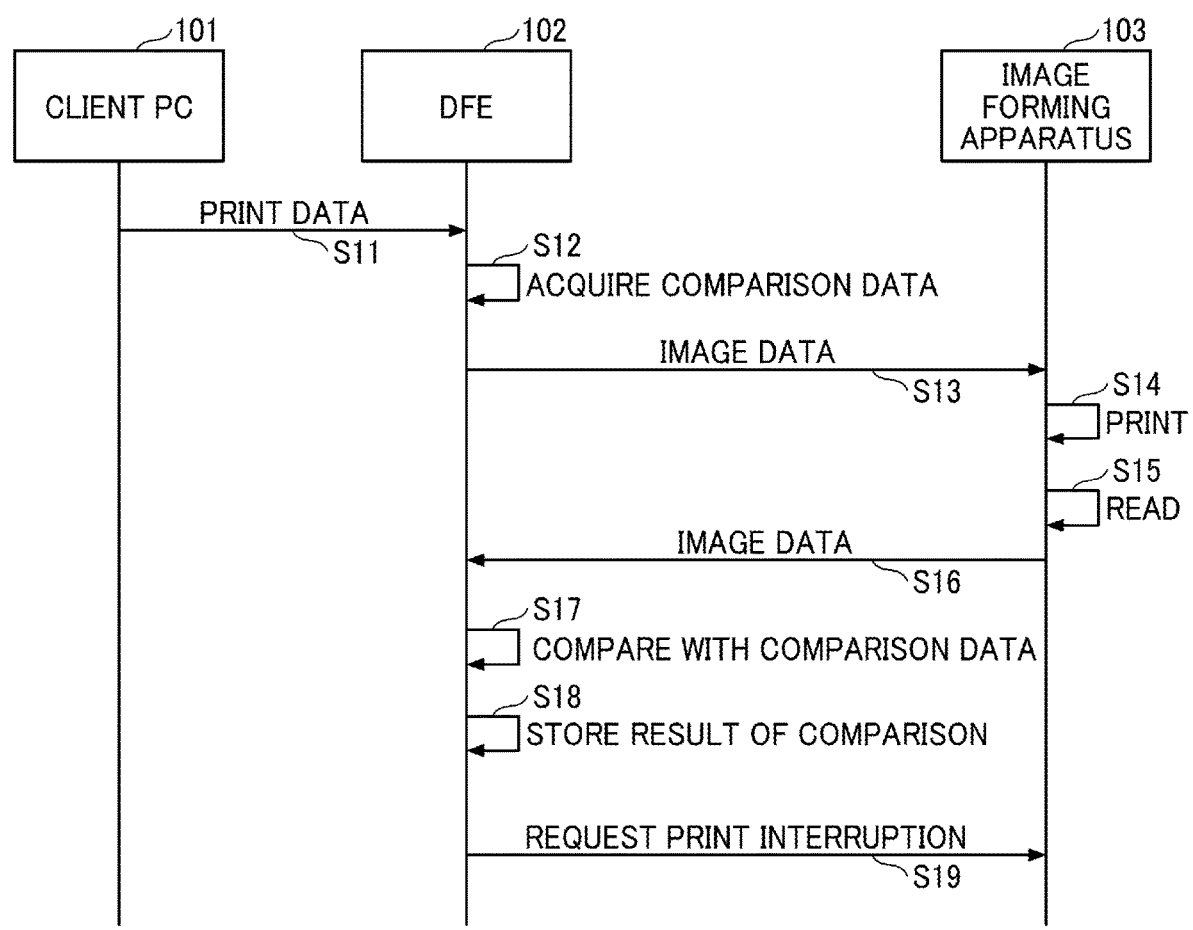
FIG. 9 is a sequence diagram illustrating a flow of process for determining whether a page of a printed form is missing by using the comparison data, according to embodiments of the present disclosure.

FIG. 9 is a sequence diagram illustrating a process in which the printing system 100 determines whether a page of a printed form is missing by using the comparison data.

First, the client PC 101 transmits print data to the DFE 102 in response to a user operation (step S11).

The communication unit 11 of the DFE 102 receives the print data, and the input unit 12 of the DFE 102 receives the print data as input data (step S12). The comparison data acquisition unit 14 of the DFE 102 acquires comparison data from the print data. The detailed description of this operation is described below with reference to FIGS. 10 to 12. Note that, before acquiring the comparison data, the data converter 13 of the DFE 102 converts the print data into a PDL data accordingly.

The communication unit 11 in the DFE 102 transmits the image data including ripped print data to the image forming apparatus 103 (step S13).

The communication unit 21 of the image forming apparatus 103 receives the image data, and the printer 22 of the image forming apparatus 103 performs printing in the order of the pages.

In the sequence diagram illustrated in FIG. 9, it is assumed that the image generation unit 23 is provided in the image forming apparatus 103, and the image generation unit 23 reads a printed material and generates image data while printing (step S15).

Immediately after reading the printed material (in real time), the communication unit 21 of the image forming apparatus 103 transmits the image data to the DFE 102 (step S16). The image forming apparatus 103 may attach a page number or the DFE 102 may assign a page number.

The communication unit 11 of the DFE 102 receives the image data from the image forming apparatus 103, and the comparison unit 16 starts comparison with the comparison data (step S17). The detailed description of this process is described below with reference to FIG. 14.

The comparison unit 16 stores the comparison result for each page, and transmits the comparison result to the management server 104 (step S18).

Figure 15:
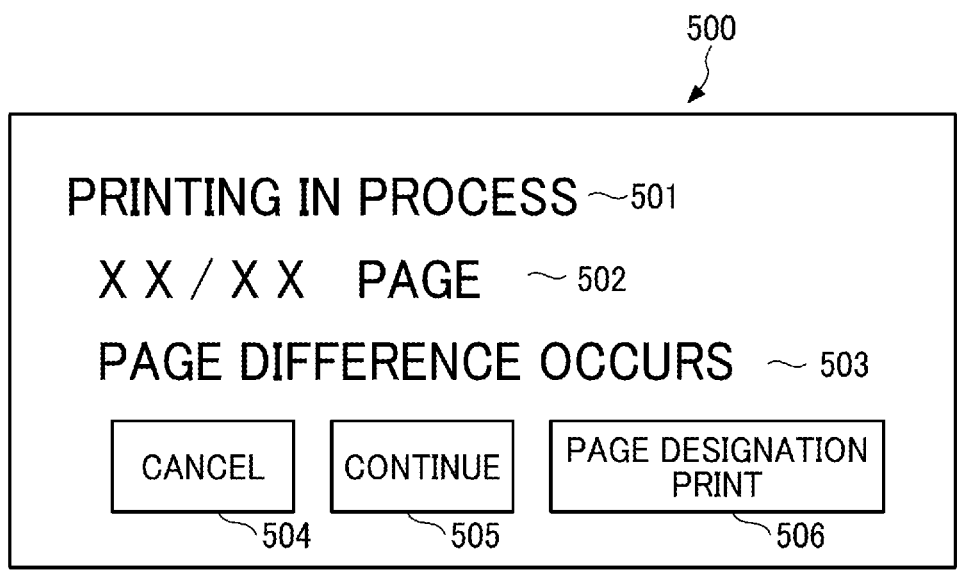
FIG. 15 is a diagram illustrating an example of a warning screen displayed on an operation unit of the image forming apparatus.

In a case where the comparison result indicates a mismatch, the communication unit 11 transmits print interruption to the image forming apparatus 103 (step S19). As a result, the image forming apparatus 103 displays a warning screen 500 as illustrated in FIG. 15.

Extraction of Comparison Data

FIG. 10 is a flowchart of an example of a method of extracting a character or an image different from a processed page as comparison data. The comparison data acquisition unit 14 determines whether the print data is the first page, based on the page break of the print data (step S101).

When the print data is the first page (YES in step S101), since a processed page for the first page of the print data is not present, the comparison data acquisition unit 14 extracts a certain number of characters or a randomly determined number of characters from a position determined based on the acquisition position information and stores these characters as comparison data. Alternatively, the comparison data acquisition unit 14 extracts an image from a position determined based on the acquisition position information and stores these characters as comparison data (step S106). The choice of whether to use characters or images as comparison data may be predetermined or determined at random.

Figure 11A:
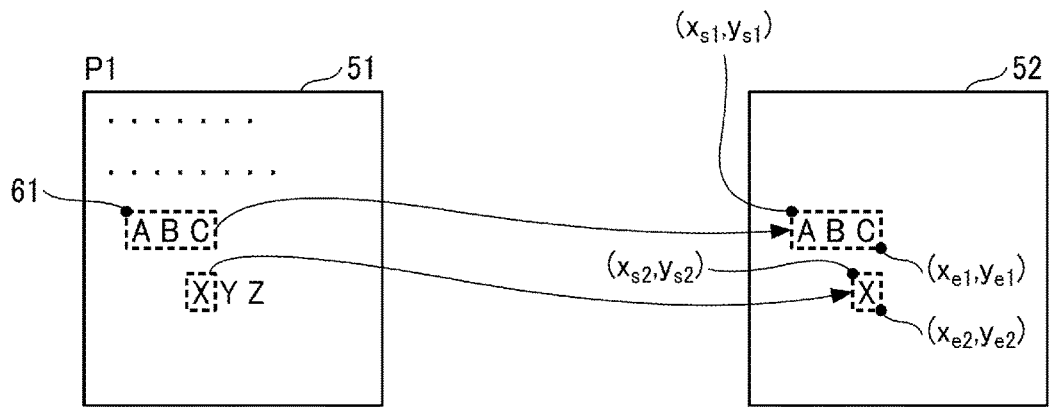
FIGS. 11A, 11B and 11C are schematic diagrams, each illustrating a method of acquiring comparison data based on the processed page, according to embodiments of the present disclosure.
Figure 11B:
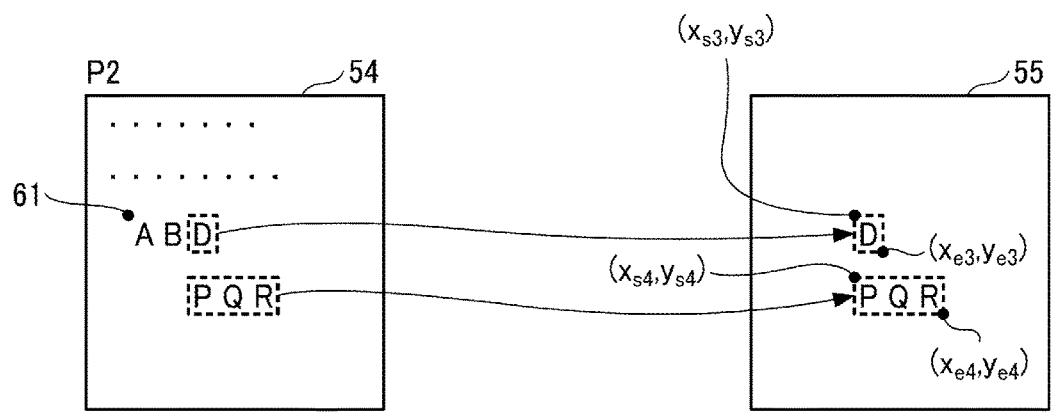
Figure 11C:
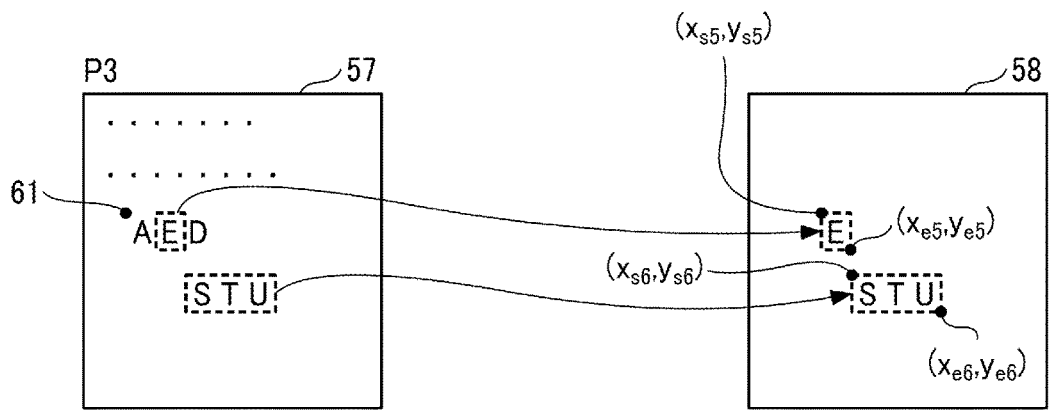

FIGS. 11A, 11B, and 11C are schematic diagrams, each illustrating a method of acquiring comparison data. FIGS. 11A, 11B, and 11C are illustrated with reference to Table 1 as an example. FIG. 11A illustrates a method of acquiring comparison data of the first page. When four characters are used as the comparison data, "ABC" and "X" are acquired in order by referring to the print data of the first page based on the acquisition position information 61, and "ABC" and "X" are used as the comparison data together with the position information. The position information of the print data 51 of P1 indicates $(x_{s1}, y_{s1})$ $(x_{e1}, y_{e1})$, $(x_{s2}, y_{s2})$ $(x_{e2}, y_{e2})$ as the vertices of the bounding rectangle of "ABC" and "X".

These four characters are examples, and the amount of data for detecting a difference between pages may be set by a user. Since the upper limit is set for the data amount (the number of characters), a comparison of the overall page is prevented.

Returning to FIG. 10, descriptions of the method of extracting a character or an image are further given. In the case of the second and subsequent pages, the comparison data acquisition unit 14 extracts one character or one image from a position determined based on the acquisition position information 61 or a position randomly determined. Although the same acquisition position information is used in FIG. 10, different acquisition position information may be prepared for each page. After the first character is determined, the following characters may be acquired one by one in order. The choice of whether to use characters or images as comparison data may be predetermined or determined at random. Alternatively, characters and images may be acquired alternately within a page.

Next, the comparison data acquisition unit 14 determines whether the same character or image is present at the same position on the processed page (step S103).

In response to a determination of "YES" in step S103, the process returns to step S102, and the next character or image is acquired. The detailed description of this process is described below with reference to FIG. 11B.

FIG. 11B illustrates a method of acquiring comparison data of the second page. When four characters are used as the comparison data, "A" is specified in order based on the acquired position information 61. However, "A" is present at the same position in the processed page (the first page). Similar to "A", "B" is also present at the same position in the processed page. "D" is not present at the same position of the processed page. Therefore, "D" is used as the comparison data. Next, "P", "Q", and "R" are not present at the same position of the processed page. Therefore, "D", "P", "Q", and "R" are used as the comparison data together with the position information. The position information of the print data 54 of P2 indicates $(x_{s3}, y_{s3})$ $(x_{c3}, y_{c3})$, $(x_{s4}, y_{s4})$ $(x_{c4}, y_{c4})$ as the vertices of the bounding rectangle of "D" and "PQR".

FIG. 11C illustrates a method of acquiring comparison data of the third page. When four characters are used as the comparison data, "A" is specified in order based on the acquired position information 61. However, "A" is present at the same position in the processed pages (the first page and the second page). "E" is not present in the same position of the processed page (the first page and the second page). Therefore, "E" is used as the comparison data. "D" is preset at the same position in the processed pages (the second page). Next, "S", "T" and "U" are also not present at the same position of the processed page (the first page and the second page). Therefore, "E", "S", "T", and "U" are used as the comparison data together with the position information. The position information of the print data 57 of P3 indicates $(x_{s5}, y_{s5})$ $(x_{c5}, y_{c5})$, $(x_{s6}, y_{s6})$ $(x_{c6}, y_{c6})$ as the vertices of the bounding rectangle of "E" and "STU". Note that the position information of the first page is the same information as the position information set in advance as the acquired position information. On the other hand, the position information created for each of the second page and the third page is the position information indicating a position where a character or image that is not present in the processed page is present in the region of the position information set in the acquired position information (or the position information created in the first page). Therefore, since the position information (i.e., region information, start point coordinates and end point coordinates in an image) changes for each page, the load of a comparison process is reduced.

TABLE 3

| Page Number | PDL Character Information | PDL Position Information | Comparison Character Information | Comparison Position Information |
|---|---|---|---|---|
| 1 | ABC | (609, 833) | ABC | (609, 833) |
|   | XYZ | (741, 983) | X | (741, 983) |
| 2 | AB | (609, 833) | Not applicable as characters are included in processed page | Not applicable as characters are included in processed page |
|   | D | (732, 833) | D | (732, 833) |
|   | PQR | (741, 983) | PQR | (741, 983) |
| 3 | A | (609, 833) | Not applicable as characters are included in processed page | Not applicable as characters are included in processed page |
|   | E | (671, 833) | E | (671, 833) |
|   | D | (727, 833) | Not applicable as characters are included in processed page | Not applicable as characters are included in processed page |
|   | STU | (741, 983) | STU | (741, 983) |
| ... | ... | ... | ... | ... |

Table 3 is a table for indicating comparison data created from the print data of Table 2. The PDL character information and the PDL position information in Table 3 are the same as the PDL character information and the PDL position information in Table 2. Comparison character information indicated in Table 3 is a character string to be acquired for comparison since the comparison character information has not been included on each page by the previous page. Comparison position information is the position information of the comparison character information.

The comparison data acquisition unit 14 creates (converts) a character different from a processed page as comparison data, from the character information and position information both being acquired from PostScript® (PDL) data. When the comparison data include four characters, the comparison unit 16 of the DFE 102 compares "A", "B", "C", and "X" of the data of the first page with the comparison data of the first page. For the second page, data of "D", "P", "Q", and "R" not included in the processed page are used as the comparison data of the second page. For the third page, data of "E", "S", "T", and "U" not included in the processed page are used as the comparison data of the third page. In other words, the comparison data acquisition unit 14 acquires comparison data from the head of the page, for each page. The comparison data include position information and character information of a predetermined number of characters that have not been acquired as comparison data by the previous page.

Note that the acquisition position information may be a fixed range (position). The comparison data acquisition unit 14 extracts a character or an image at a fixed position from the print data and sets the extracted character or image as comparison data in association with the position information.

When the page is a blank page without characters or images, the comparison data acquisition unit 14 records the comparison data as a blank page.

Although characters are acquired as comparison data in FIG. 11, an image may be acquired in the same manner. Since the print position of an image such as an image formatted in JPEG or formatted in graphics interchange format (GIF) is specified in the print data, the comparison data acquisition unit 14 specifies the image in the order of appearance in the page and determines whether the same image is present at the same position in the past page. In a case where the images are compared, colors of the images at the same pixel positions are compared.

Returning to FIG. 10, descriptions of the method for extracting a character or an image are further given. The comparison data acquisition unit 14 stores the position information and the character or image in the comparison data storage unit 19 (step S104). When storing the character, a method of storing characters is used such as converting characters into image data or storing character codes without performing any conversion.

The comparison data acquisition unit 14 determines whether a predetermined number of characters or images has been stored (step S105). Since it is less likely that the images are less likely, than characters, to have the same images printed on a plurality of pages, a relatively smaller number of images may be stored when compared with the number of characters of the comparison data.

In response to a determination of "No" in step S105, the process returns to step S102.

As described above, comparison data that does not overlap in any pages is stored in the comparison data storage unit 19.

Further, as illustrated in FIG. 12, the comparison data acquisition unit 14 may extract a character or an image different from the comparison data of the processed page, as comparison data. FIG. 12 is a flowchart of a method of extracting a character or an image different from the comparison data of the processed page, as comparison data. The description given in reference to FIG. 12 mainly includes the differences from FIG. 10.

In the process of FIG. 12, the processing of step S203 is different from the processing of step S103 of FIG. 10. In other words, in step S203, the comparison data acquisition unit 14 determines whether the same character or the same image is registered at the same position in the comparison data of the processed page (step S203).

Figure 13:
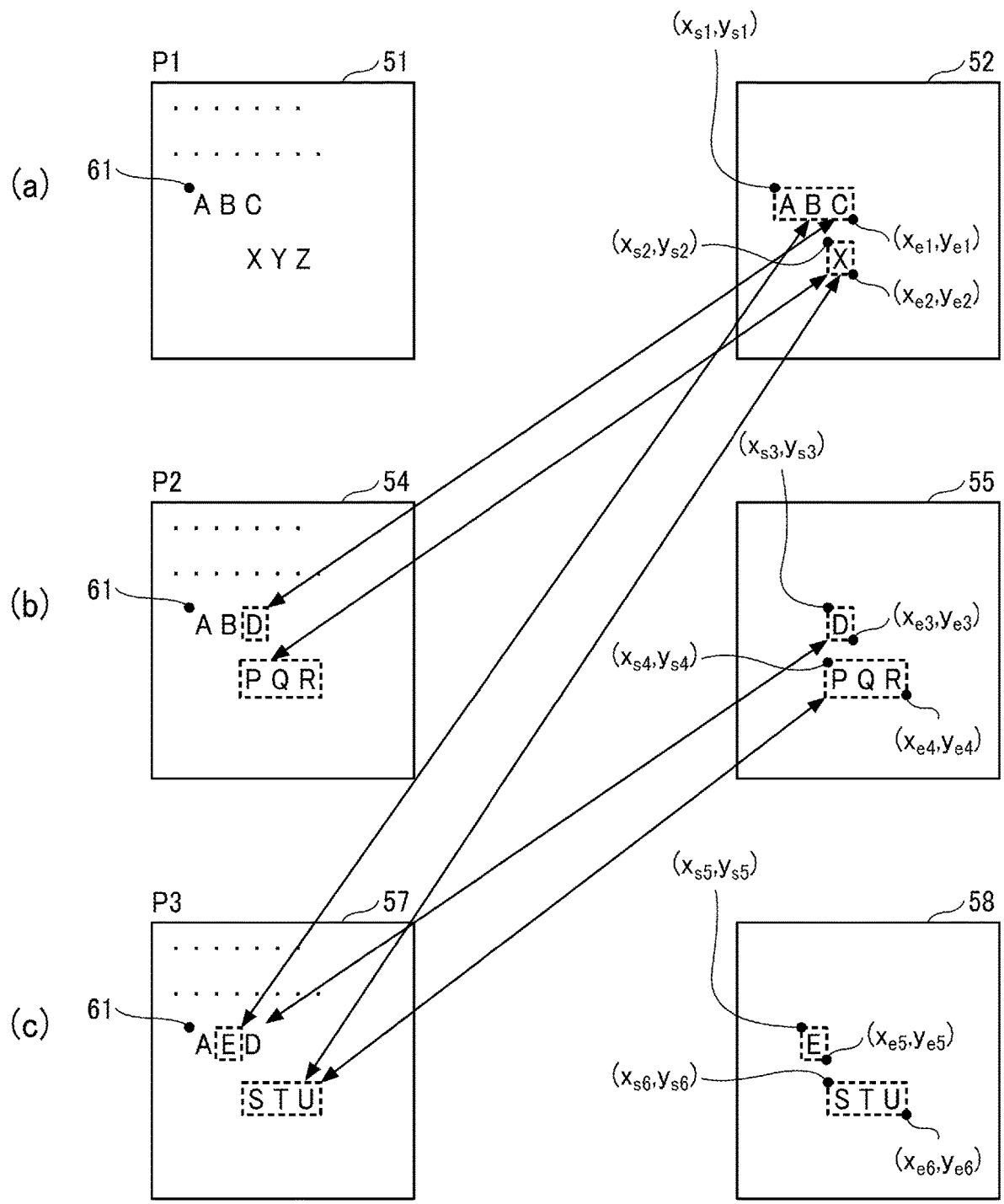
FIG. 13 is a schematic diagram illustrating a method of acquiring comparison data based on the processed comparison data, according to embodiments of the present disclosure.

FIG. 13 including FIGS. 13(a), 13(b), and 13(c) is a schematic diagram illustrating a method of acquiring comparison data. Similar to FIG. 11A, FIG. 13(a) depicts the comparison data of the first page.

FIG. 13(b) illustrates a method of acquiring the comparison data of the second page. When four characters are used as the comparison data, "A" is specified in order based on the acquired position information 61. However, "A" is present at the same position in the comparison data of the processed page (the first page). Similar to "A", "B" is also present at the same position in the comparison data of the processed page. "D" is not present at the same position in the comparison data of the processed page. Therefore, "D" is used as the comparison data. Next, "P", "Q", and "R" are not present at the same position in the comparison data of the processed page. Therefore, "D", "P", "Q", and "R" are used as the comparison data together with the position information. The position information of the print data 54 of P2 indicates $(x_{s3}, y_{s3})$ $(x_{e3}, y_{e3})$, $(x_{s4}, y_{s4})$ $(x_{e4}, y_{e4})$ as the vertices of the bounding rectangle of "D" and "PQR".

FIG. 13c illustrates a method of acquiring comparison data of the third page. When four characters are used as the comparison data, "A" is specified in order based on the acquired position information 61. However, "A" is present at the same position in the comparison data of the processed page (the first page). "E" is not present in the same position in the comparison data of the processed page (the first page and the second page). Therefore, "E" is used as the comparison data. "D" is preset at the same position in the comparison data of the processed pages (the second page). Next, "S", "T" and "U" are also not present at the same position in the comparison data of the processed page (the first page and the second page). Therefore, "E", "S", "T", and "U" are used as the comparison data together with the position information. The position information of the print data 57 of P3 includes $(x_{s5}, y_{s5})$ $(x_{e5}, y_{e5})$, $(x_{s6}, y_{s6})$ $(x_{e6}, y_{e6})$ as the vertices of the bounding rectangle of "E" and "STU".

The method of extracting the comparison data by comparing the contents of the pages with the comparison data has an advantage in that the load of the comparison process is relatively smaller than the method of comparing the contents of the pages. In other words, in a case where the number of pages of the print data is significantly large, for example, several thousands of pages to several tens of thousands of pages, the number of objects to be compared is relatively smaller when compared with the comparison data.

Although the comparison data in each of FIGS. 11A, 11B, and 11C is the same as the comparison data in each of FIGS. 13(a), 13(b), and 13(c) of FIG. 13, the comparison data may be different depending on which of the processed page and the comparison data of the processed page is to be compared.

Comparison Between Image Data of Printed Material and Comparison Data

Figure 14:
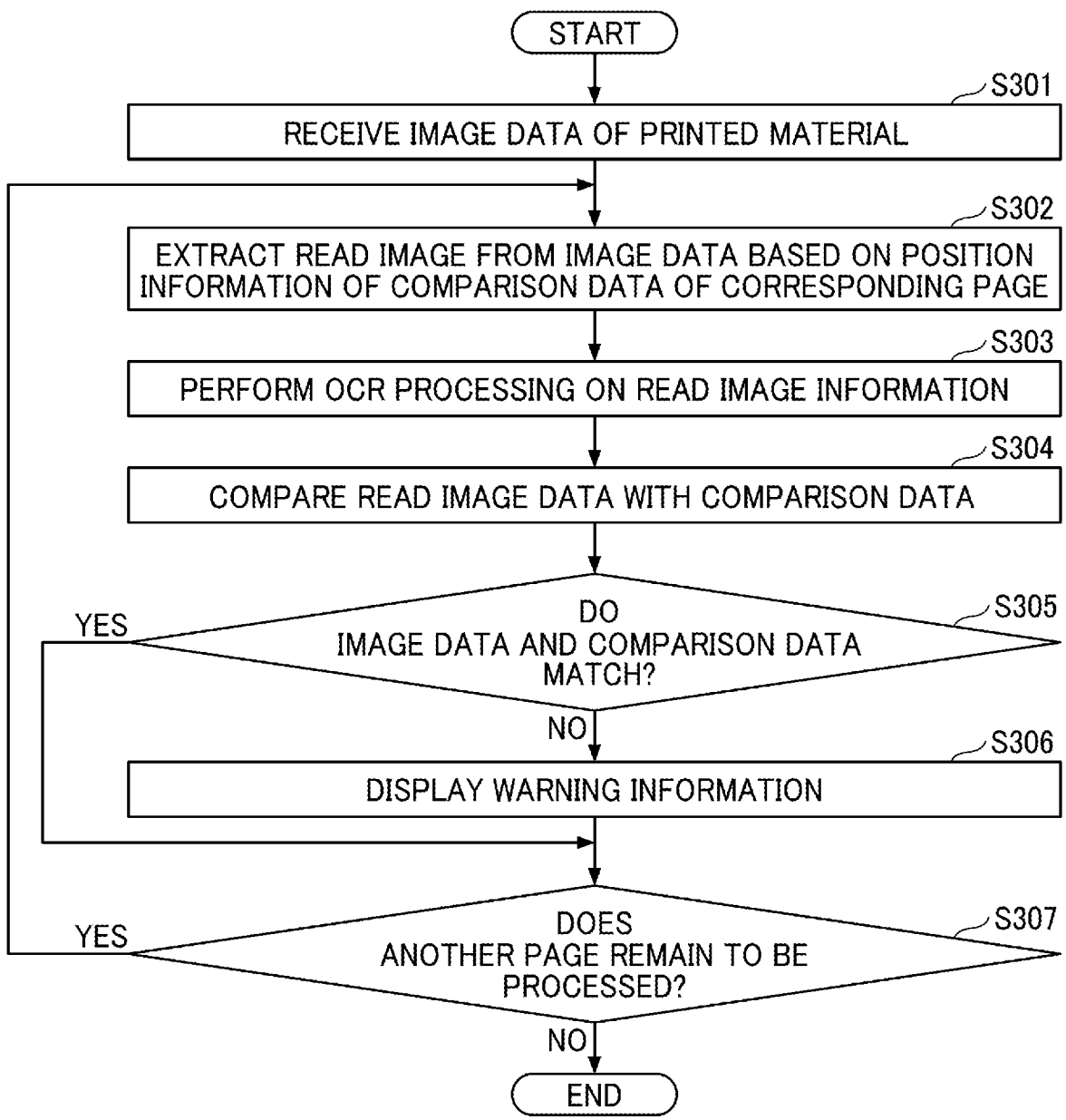
FIG. 14 is flowchart of an example of a procedure in which a comparison unit compares image data of a printed material with comparison data.

FIG. 14 is flowchart of an example of a procedure in which the comparison unit 16 compares the image data of the printed material with the comparison data. Note that the comparison may be executed in parallel with the printing or may be performed after the printing is finished.

The DFE 102 receives the image data of the printed material (step S301).

Based on the page number attached to the image of the printed material (or by counting the page number), the image acquisition unit 15 extracts the read image data from the image data referring to the position information of the comparison data of the page to be compared (step S302).

In a case where the comparison data is a character, the comparison unit 16 executes OCR process on the read image data to convert the data into a character code (step S303).

Next, the comparison unit 16 compares the read image data with the comparison data (step S304). When the read image data and the comparison data match (YES in step S305), the process proceeds to step S307. Note that the comparison between the image data is executed on a pixel-by-pixel basis. When the pixels match at a ratio equal to or greater than a certain ratio, the image data may be deemed that the image data match (complete matching is not desired).

When the read image data and the comparison data do not match (NO in step S305), the output unit 17 outputs a warning display (step S306). In a case where the DFE 102 executes the comparison process, the output unit 17 may transmit the comparison result to the operation panel 308 of the image forming apparatus 103. Alternatively, the output unit 17 may display the comparison result on the console of the management server 104. The output unit 17 may display the comparison result on the console of the DFE 102. In a case where the image forming apparatus 103 executes the comparison, the image forming apparatus 103 may automatically execute the warning display without an instruction from the DFE 102.

When printing and comparison are executed in parallel, the communication unit 11 requests the image forming apparatus 103 to interrupt the printing.

When another page to be processed remains, the comparison unit 16 continues the comparison process (step S307). Even if the printing is interrupted, the comparison is executed. However, in a case where a page is missing, the comparison data and the read image data high likely do not match in pages subsequent to the page in which the comparison data and the read image data do not match. For this reason, the comparison process may also be interrupted.

In reading a printed material, the orientation of the printed material may change depending on the setting direction in the ADF 411, and the orientation of the printed material may be rotated by the angle of 90° (degrees), 180° (degrees) or 270° (degrees). The image acquisition unit 15 may rotate the image data of the printed material and acquire the read image data from each rotation angle.

Supplemental Description in Case where Comparison Results do not Match

When printing and comparison are executed in parallel, the comparison unit 16 stops printing of the image forming apparatus 103. The output unit 17 displays and prints the mismatched page number and waits for confirmation by a user.

Alternatively, the image forming apparatus 103 may further include a setting in which the user responds to a page difference after printing. When the setting is valid, the image forming apparatus 103 prints each page of the image data even if a page difference has occurred. After the printing is finished, the image forming apparatus 103 displays and prints the corresponding page number of the mismatch. This printing may be performed by another image forming apparatus 103.

FIG. 15 is a diagram illustrating an example of the warning screen 500 displayed by the operation unit 24 of the image forming apparatus 103. FIG. 15 illustrates an example of the warning screen 500 in a case where printing and comparison are performed in parallel. The image forming apparatus 103 that displays the warning screen 500 may be different from the image forming apparatus 103 that performs printing. A display message 501 indicates that printing is currently being performed. A display message 502 indicates the page number of printed pages or of mismatched page on the left, out of the total number of pages on the right. A display message 503 displays "page difference occurs" and indicates that the comparison result is mismatched. A cancel button 504 is a button for receiving cancellation of the printing. In other words, since the printing is being interrupted, the user may instruct cancellation of the printing at the time point when the mismatch occurs. A continue button 505 is a button for receiving continuation of the printing. In other words, since the printing is being interrupted, the user may instruct continuation of the printing even though the mismatch occurs. The page designation print button 506 is a button for displaying another dialog box and receiving a page number or a page range to be printed. In other words, since the printing is being interrupted, the user may instruct printing again, the page (and subsequent pages) in which the mismatch has occurred. The image forming apparatus 103 may be another printer.

Note that the output unit 17 may display the comparison data and the read image data not matching each other, on the warning screen 500. In addition, the output unit 17 may display page difference content as to which of a character or an image is different.

Supplemental Description in Case where Comparison is Executed After Printing

In a case where a reading mechanism is not included in a sheet conveyance passage of the image forming apparatus 103 and the scanner 410 performs the reading, the DFE 102 starts comparison between comparison data and read image data after a user specifies a form name. Since the DFE 102 is not informed in advance of the form of a printed material to be read, the DFE 102 starts comparison after the user specifies the name of the form to be read. Alternatively, the image forming apparatus 103 may read the first page of the printed material and identify a matching form from the comparison data. When a form to be read is not identified in the first page, the image forming apparatus 103 reads the second and subsequent pages of the printed material to identify a matching form from the comparison data.

In a case where the comparison result is not matched, the comparison unit 16 of the DFE 102 stops reading. The output unit 17 displays or prints the page difference content or the corresponding page number and waits for confirmation by the user. Alternatively, when a reading mechanism do not stop reading and a mismatch is detected, each page is read to display or print the page difference content and the number of corresponding pages. The page difference content and the number of corresponding pages may be printed after each page is compared.

Figure 16:
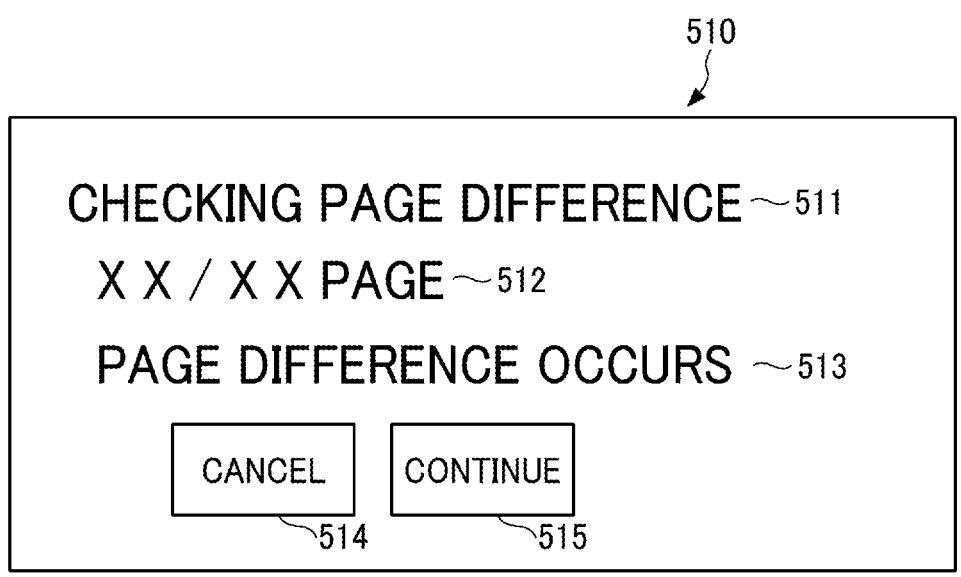
FIG. 16 is a diagram illustrating an example of a warning screen displayed on the display and operation unit of the image forming apparatus.

FIG. 16 is a diagram illustrating an example of the warning screen 510 displayed by the operation unit 24 of the image forming apparatus 103.

FIG. 16 illustrates an example of the warning screen 510 in a case where comparison is executed after printing is completed.

A display message 511 displays "checking page difference" and indicates that comparison is being executed at present.

A display message 512 indicates a page number being compared or a page number for which the comparison result indicates a mismatch on the left, out of the total number of pages on the right.

A display message 513 displays "page difference occurs" and indicates that the comparison result is mismatched.

A cancel button 514 is a button for receiving cancellation of the comparison.

A continue button 515 is a button for receiving continuation of the comparison.

Note that the output unit 17 may display the comparison data and the read image data not matching with each other on the warning screen 510.

Management of Print Job

The management server 104 manages an execution state of a print job. A comparison result between the comparison data and the read image data is also registered in the execution state of the print job managed by the management server 104. A console of the management server 104 and the client PC 101 may display the executing state of the print job.

FIG. 17 is a diagram illustrating an example of a print job management screen 520 displayed by the console of the management server 104 or the client PC 101. The print job management screen 520 includes items of a print job management number 521, a form name 522, an image forming apparatus 523, a state of print job 524, and the number of pages 525. The print job management number 521 is identification information for identifying a print job. The form name 522 is the name of a printed form. The form name 552 may be referred to as a file name. The image forming apparatus 523 is the name or identification information of the image forming apparatus 103 to which the print job is assigned. The state of print job 524 indicates the state of the print job. The state of the print job 524 includes the states of print completion, printing, page difference occurrence, and print waiting. The number of pages 525 indicates the total number of pages of the print job.

A print job indicating the state of page difference occurrence is emphasized by a color, and a sub screen 530 is displayed when the user clicks on the corresponding state of print job. The sub screen 530 displays a page number 531 in which a mismatch has occurred, a difference content 532, a cancel button 533, and a continue button 534. The user may also cancel or continue printing from the print job management screen 520.

Example of Form

FIG. 18 is a diagram illustrating an example of the form. Characters are electronically input to the form via a PC. In the case of handwriting input, the comparison data may be image data. FIG. 18 illustrates a cover of a form as an example. However, a plurality of pages such as another page of an accompanying form, a trial balance, and an image data are included. The method of confirming the page of the present embodiment achieves determination of whether each page has been printed.

Main Effects

According to the present embodiment, different comparison data is extracted for each page. Due to such a configuration, when the image data of the printed material and the comparison data are compared, it is determined that each page of the print data is printed by comparing a relatively small amount of data. Since the print data is not compared with the overall page of the printed material, misjudgment in comparison is not likely to occur on the presence or absence of dust on the page or faint in the character or image of the page. A difference in a page state such as page omission or insertion of incorrect page in the printing of a form may be accurately detected when printing a form in which the quality does not matter whether a printed material is printed according to print data.

Other Application Examples

The present disclosure is not limited to the embodiments described above, and various modifications and improvements are possible without departing from the gist of the present disclosure.

For example, although an electrophotographic image forming apparatus has been described in the present embodiment, another type of image forming apparatus such as inkjet image forming apparatus that employs an inkjet system may perform printing.

The numbers such as ordinal numbers and numerical values that indicates quantity are all given by way of example to describe the technologies to implement the embodiments of the present disclosure, and no limitation is indicated to the numbers given in the above description. In addition, the above-describe connections among the components are examples for specifically describing the technology of the present invention, and connections for implementing functions of the present invention are not limited to the above-described examples.

Further, the division of blocks in the functional block diagrams is given by way of example. A plurality of blocks may be implemented as one block, or one block may be divided into a plurality of blocks. Alternatively, some functions may be moved to other blocks. Further, the functions of a plurality of blocks that have similar functions may be processed in parallel or in a time-division manner by a single unit of hardware or software.

The followings are some modes of the present disclosure.

Mode 1

A printing system includes an input unit, a comparison data acquisition unit, an image acquisition unit, and an output unit. The input unit acquires print data of a plurality of pages. The comparison data acquisition unit extracts comparison data from the print data for each page. The image acquisition unit from first image data read from a printed material on which the print data is printed, acquire second image data at a position corresponding to the comparison data, for each page of the printed material. The output unit outputs a comparison result of the comparison data and the read image data for each page.

Mode 2

The printing system according to Mode 1, the comparison data acquisition unit is configured to extract the comparison data together with position information on the position corresponding to the comparison data for each page. The image acquisition unit is configured to acquire the second image data at the position corresponding to the comparison data, from the first image data read from the printed material, based on the position information for each page of the printed material.

Mode 3

The printing system according to Mode 2, the comparison data acquisition unit is configured to extract the comparison data and the position information for a first page of the print data, based on acquisition position information set in advance. The comparison data acquisition unit is configured to extract a character or an image of a second or subsequent page of the print data as the comparison data for the second or subsequent page, the character or the image being determined based on the acquisition position information set in advance and being different from a character or an image of a processed page.

Mode 4

The printing system according to Mode 2, the comparison data acquisition unit is configured to extract the comparison data and the position information for a first page of the print data, based on acquisition position information set in advance. The comparison data acquisition unit is configured to extract a character or an image of a second or subsequent page of the print data as the comparison data for the second or subsequent page, the character or the image being determined based on the acquisition position information set in advance and being different from a character or an image of the comparison data for a processed page.

Mode 5

The printing system according to any one of Modes 1 to 4, the comparison unit is configured to convert the second image data into character data by an optical character recognition process in a case where the comparison data is character data. The comparison unit is configured to compare the character data of the second image data with the character data of the comparison data.

Mode 6

The printing system according to any one of Modes 1 to 5, the printing system further includes a communication unit. The communication unit is configured to cause an image forming apparatus of the printing system to interrupt printing the print data in response to a comparison result indicating that the comparison data and the second image data do not match, when the comparison data and the second image data are compared while the print data is printed.

Mode 7

The printing system according to Mode 6, the image forming apparatus includes an operation unit. The output unit is configured to cause the operation unit to display a page number that does not match between the comparison data and the second image data, a print cancel button, a print continue button, and a page designation print button for designating and printing a page in response to the comparison result indicating that the comparison data and the second image data do not match.

Mode 8

The printing system according to any one of Modes 1 to 7, the print data includes character information and position information for each character string of one or more characters. The comparison data acquisition unit is configured to acquire the character information and the position information in association with each other for each page before acquiring the comparison data.

Mode 9

The printing system according to Mode 8, the comparison data acquisition unit is configured to acquire, as the comparison data, number-designated character information of a predetermined number of characters from the character information acquired for each page in an order of the plurality of pages. The comparison data acquisition unit is configured to acquire the position information and the number-designated character information having a predetermined number of characters having not been acquired as the comparison data for a processed page, as the comparison data for each page from a first page of the plurality of pages.

Mode 10

The printing system according to Mode 9, the comparison data acquisition unit is configured to acquire, as the comparison data, the position information different for each page.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A printing system comprising:
processing circuitry configured to:
acquire print data of a plurality of pages;
extract comparison data from the print data for each page, the comparison data being a subset of the print data that corresponds to a specific region in a two-dimensional plane represented by the print data,
acquire first image data read from a printed material on which the print data is printed for each page of the printed material, the first image data including partial data that corresponds to a partial region corresponding to the specific region of the comparison data,
extract the partial data as second image data from the first image data,
compare the comparison data and the second image data for each page to obtain a comparison result, and output the comparison result.

2. The printing system according to claim 1,
wherein the processing circuitry is configured to:
extract the comparison data together with position information, the position information being position data corresponding to the specific region; and
extract the second image data based on the position information.

3. The printing system according to claim 2,
wherein the processing circuitry is configured to:
extract the comparison data and the position information for a first page of the print data, based on acquisition position information set in advance; and
extract a character or an image of a second or subsequent page of the print data as the comparison data for the second or subsequent page, the character or the image being determined based on the acquisition position information set in advance and being different from a character or an image of a processed page.

4. The printing system according to claim 2,
wherein the processing circuitry is configured to:
extract the comparison data and the position information for a first page of the print data, based on acquisition position information set in advance; and
extract a character or an image of a second or subsequent page of the print data as the comparison data for the second or subsequent page, the character or the image being determined based on the acquisition position information set in advance and being different from a character or an image of the comparison data for a processed page.

5. The printing system according to claim 1,
wherein the processing circuitry is configured to:
convert the second image data into character data by an optical character recognition process in a case where the comparison data is character data; and
compare the character data of the second image data with the character data of the comparison data.

6. The printing system according to claim 1,
wherein the processing circuitry is configured to cause an image forming apparatus of the printing system to interrupt printing the print data in response to the comparison result indicating that the comparison data and the second image data do not match, when the comparison data and the second image data are compared while the print data is printed.

7. The printing system according to claim 6,
wherein the image forming apparatus includes an operation unit, and
wherein the processing circuitry is configured to cause the operation unit to display a page number that does not match between the comparison data and the second image data, a print cancel button, a print continue button, and a page designation print button for designating and printing a page in response to the comparison result indicating that the comparison data and the second image data do not match.

8. The printing system according to claim 1,
wherein the print data includes character information and position information for each character string of one or more characters, and
wherein the processing circuitry is configured to acquire the character information and the position information in association with each other for each page before acquiring the comparison data.

9. The printing system according to claim 8,
wherein the processing circuitry is configured to:
acquire, as the comparison data, number-designated character information of a predetermined number of characters from the character information acquired for each page in an order of the plurality of pages; and
acquire the position information and the number-designated character information having a predetermined number of characters having not been acquired as the comparison data for a processed page, as the comparison data for each page from a first page of the plurality of pages.

10. The printing system according to claim 9,
wherein the processing circuitry is configured to acquire, as the comparison data, the position information different for each page.

11. An image processing apparatus comprising:
processing circuitry configured to:
acquire print data of a plurality of pages;
extract comparison data from the print data for each page, the comparison data being a subset of the print data that corresponds to a specific region in a two-dimensional plane represented by the print data,
acquire first image data read from a printed material on which the print data is printed for each page of the printed material, the first image data including partial data that corresponds to a partial region corresponding to the specific region of the comparison data,
extract the partial data as second image data from the first image data,
compare the comparison data and the second image data for each page to obtain a comparison result, and
output the comparison result.

12. The image processing apparatus according to claim 11, wherein the processing circuitry is configured to:
extract the comparison data together with position information, the position information being position data corresponding to the specific region; and
extract the second image data based on the position information.

13. A comparison method comprising:
acquiring print data of a plurality of pages;
extracting comparison data from the print data for each page, the comparison data being a subset of the print data that corresponds to a specific region in a two-dimensional plane represented by the print data,
acquiring first image data read from a printed material on which the print data is printed for each page of the printed material, the first image data including partial data that corresponds to a partial region corresponding to the specific region of the comparison data,
extracting the partial data as second image data from the first image data,
comparing the comparison data and the second image data for each page to obtain a comparison result, and
outputting the comparison result.

\* \* \* \* \*